(12) United States Patent
Hatcherson et al.

(10) Patent No.: US 10,083,621 B2
(45) Date of Patent: Sep. 25, 2018

(54) SYSTEM AND METHOD FOR STREAMING VIDEO INTO A CONTAINER-BASED ARCHITECTURE SIMULATION

(71) Applicant: ZedaSoft, Inc., Fort Worth, TX (US)

(72) Inventors: Robert Allen Hatcherson, Fort Worth, TX (US); Stephen Edward Tarter, Fort Worth, TX (US); Jeremiah Jay Johnson, Arlington, TX (US); Frederick Bryan Fleury, Fort Worth, TX (US); George William Estep, II, Aledo, TX (US); Richard Keith Holt, Fort Worth, TX (US)

(73) Assignee: ZEDASOFT, INC., Fort Worth, TX (US)

( * ) Notice: Subject to any disclaimer, the term of this patent is extended or adjusted under 35 U.S.C. 154(b) by 731 days.

(21) Appl. No.: 14/524,659

(22) Filed: Oct. 27, 2014

(65) Prior Publication Data

US 2015/0072316 A1    Mar. 12, 2015

Related U.S. Application Data

(63) Continuation-in-part of application No. 13/317,447, filed on Oct. 18, 2011, now Pat. No. 8,881,094, which
(Continued)

(51) Int. Cl.
*G09B 9/30* (2006.01)
*G06F 17/50* (2006.01)

(52) U.S. Cl.
CPC ......... *G09B 9/301* (2013.01); *G06F 17/5009* (2013.01); *G06F 2217/16* (2013.01)

(58) Field of Classification Search
CPC .. G09B 9/301; G06F 17/5009; G06F 2217/16
(Continued)

(56) References Cited

U.S. PATENT DOCUMENTS 4,811,245 A * 3/1989 Bunker ............... G09B 9/301
                                                      345/440
5,017,141 A * 5/1991 Relf ................... G09B 9/08
                                                      434/29
(Continued)

FOREIGN PATENT DOCUMENTS

WO    2012149685 A1    11/2012
WO    2013163221 A1    10/2013

OTHER PUBLICATIONS

Engelke, NH. El al., "Integrated Manufacturing Modeling System," Jul. 1985, International Business machines Corporation.
(Continued)

*Primary Examiner* — John Chavis
(74) *Attorney, Agent, or Firm* — Schultz & Associates, P.C.

(57) ABSTRACT

The present invention relates generally to a software architecture for simulation of physical entities. The invention provides an object-oriented container based framework architecture for simulator software implementations, methods, and objects in a time domain on a distributed computer network. The invention further provides an interface system and a plug-in definition which allows compartmentalization of participants in the container and easy extensibility of the system. The invention further provides a system and method for streaming video in a container-based architecture.

21 Claims, 15 Drawing Sheets

Related U.S. Application Data is a continuation-in-part of application No. 12/378,905, filed on Feb. 20, 2009, now Pat. No. 8,150,664, which is a continuation of application No. 11/140,109, filed on May 27, 2005, now Pat. No. 7,516,052.

(60) Provisional application No. 60/575,655, filed on May 27, 2004.

(58) Field of Classification Search
USPC .......................................... 434/30; 717/101
See application file for complete search history.

(56) References Cited

U.S. PATENT DOCUMENTS

| | | | | |
|---|---|---|---|---|
| 5,255,211 | A * | 10/1993 | Redmond | G06F 3/012 700/90 |
| 5,541,863 | A * | 7/1996 | Magor | G05B 17/02 701/14 |
| 5,544,297 | A * | 8/1996 | Milne | G06F 17/30017 707/E17.009 |
| 5,598,532 | A | 1/1997 | Liron | |
| 5,616,030 | A * | 4/1997 | Watson | G09B 9/08 434/29 |
| 5,680,590 | A * | 10/1997 | Parti | G09B 23/28 703/11 |
| 5,719,786 | A * | 2/1998 | Nelson | H04L 29/06 348/14.15 |
| 6,126,548 | A * | 10/2000 | Jacobs | A63F 13/12 463/42 |
| 6,353,846 | B1 * | 3/2002 | Fleeson | G06F 9/5011 718/104 |
| 6,380,954 | B1 | 4/2002 | Gunther | |
| 6,757,328 | B1 * | 6/2004 | Huang | G08G 1/04 375/240.1 |
| 7,058,721 | B1 * | 6/2006 | Ellison | G11B 27/031 348/E5.008 |
| 7,065,553 | B1 | 6/2006 | Chesley et al. | |
| 7,080,092 | B2 | 7/2006 | Upton | |
| 7,149,691 | B2 * | 12/2006 | Balan | G10L 15/22 704/270 |
| H2201 | H | 9/2007 | Stytz et al. | |
| 7,275,237 | B1 | 9/2007 | Schneider et al. | |
| 8,303,387 | B2 | 11/2012 | Spivack | |
| 8,333,592 | B2 | 12/2012 | Swan | |
| 8,488,011 | B2 | 7/2013 | Blanchflower et al. | |
| 8,514,949 | B1 * | 8/2013 | Keller | H04N 19/44 348/388.1 |
| 8,605,133 | B2 | 12/2013 | Lampotang et al. | |
| 2002/0010938 | A1 * | 1/2002 | Zhang | H04L 47/263 725/95 |
| 2002/0059467 | A1 | 5/2002 | Rapp et al. | |
| 2002/0069039 | A1 * | 6/2002 | Ricks | G06F 17/5009 703/1 |
| 2002/0087744 | A1 | 7/2002 | Kitchin | |
| 2002/0184301 | A1 | 12/2002 | Parent | |
| 2002/0184348 | A1 | 12/2002 | Rapp et al. | |
| 2002/0196285 | A1 | 12/2002 | Sojoodi et al. | |
| 2002/0198931 | A1 | 12/2002 | Murren et al. | |
| 2003/0004925 | A1 * | 1/2003 | Knoblock | G06Q 10/06 |
| 2003/0033369 | A1 | 2/2003 | Bernhard | |
| 2003/0058277 | A1 | 3/2003 | Bowman-Amuah | |
| 2003/0060965 | A1 | 3/2003 | McPhail et al. | |
| 2003/0079052 | A1 | 4/2003 | Kushnirskiy | |
| 2003/0118971 | A1 * | 6/2003 | Rogachev | F41G 3/26 434/11 |
| 2003/0126311 | A1 | 7/2003 | Kushnirskiy et al. | |
| 2003/0135660 | A1 * | 7/2003 | Mortazavi | G06F 8/67 719/315 |
| 2003/0174147 | A1 | 9/2003 | Jaffe | |
| 2003/0177282 | A1 | 9/2003 | Hejlsberg et al. | |
| 2003/0215771 | A1 * | 11/2003 | Bartoldus | G09B 9/00 434/14 |
| 2004/0015822 | A1 | 1/2004 | Linton et al. | |
| 2004/0186764 | A1 | 9/2004 | McNeill | |
| 2005/0017977 | A1 * | 1/2005 | Simpson | G06F 17/5095 345/473 |
| 2008/0147366 | A1 | 6/2008 | Schutz et al. | |
| 2010/0159434 | A1 | 6/2010 | Lampotang et al. | |
| 2011/0027761 | A1 | 2/2011 | Nunez et al. | |
| 2013/0132510 | A1 | 5/2013 | Ye et al. | |
| 2013/0147819 | A1 | 6/2013 | Dharmapurikar | |
| 2013/0194436 | A1 | 8/2013 | Unice | |
| 2013/0254417 | A1 | 9/2013 | Nicholls | |
| 2013/0276048 | A1 | 10/2013 | Krasic et al. | |

OTHER PUBLICATIONS

Yu, Bin, and Klara Nahrstedt. "Internet-based interactive HDTV." Multimedia Systems 9.5 (2004). http://cairo.cs.uiuc.edu/publications/papers/binyu_mmsj121.pdf.

Lee, Min-Jeong, et al. "Real-time video watermarking system on the compressed domain for high-definition video contents: Practical issues." Digital Signal Processing 22.1 (2012): 190-198. http://www.rmcet.com/lib/E-Journals/Digital%20Signal%20Processing/Volume%2022,%20Issue%201,%20Pages%201-210%20(January%202012)/Realtime%20video%20watermarking%20system%20on%20the%20compressed%20domain%20for.pdf.

Hock, Kia Siang, and L. I. Lingxia. "Automated processing of massive audio/video content using FFmpeg." http://journal.code4lib.org/articles/9128?utm_source=feedburner&utm_medium=feed&utm_campaign=Feed%3A+c4lj+(The+Code4Lib+Journal).

* cited by examiner

| | | |
|---|---|---|
| DIS Controller - 5 | | |
| 955 — Exercise ID | 137 | |
| 960 — Site ID | 137 | |
| 970 — Application ID | 137 | |
| 975 — Inet Address | 172.16.1.255 | |
| 980 — Port | 31.37 | |
| 982 — Send and Receive Entity PDUs | ☐ | |
| 984 — Send and Receive Warfare PDUs | ☐ | |
| 986 — Send Simulation Management PDUs | ☐ | |
| 988 — Receive Simulation Managment PDUs | ☐ | |
| 990 — Send and Receive IFDL PDUs | ☑ | |
| 992 — Wrap PDUs | ☐ | |
| Wrap PDU Northing (ft) | 0.0 | |
| Wrap PDU Northing (ft) | 0.0 | |
| Logging | ☐ | |
| Dead Reckoning Logging Level 1 | ☐ | |
| Bundle PDUs | ☑ | |
| Dead Reckoning Position Threshold (Meters) | 1.0 | |
| Num PDU Filters | 5 | |
| Smooth Position | ☑ | |
| Dead Reckoning Enabled | ☑ | |
| Sync Wrapped PDUs | ☐ | |
| Dead Reckon Native Using Local Level | ☐ | |
| Dead Reckon Foreign Using Local Level | ☐ | |
| Foreign Entity Translation URL | com/zedasoft/net/dis/translation/nativeEnti | |
| Native Entity Translation URL | com/zedasoft/net/dis/translation/nativeEnti | |
| 953 — Edit | | |

FIG. 10

SYSTEM AND METHOD FOR STREAMING VIDEO INTO A CONTAINER-BASED ARCHITECTURE SIMULATION

CROSS-REFERENCE TO RELATED APPLICATIONS

This application is a continuation in part of U.S. application Ser. No. 13/317,447 filed on Oct. 18, 2011, which is a continuation in part of U.S. application Ser. No. 12/378,905 filed on Feb. 20, 2009, now U.S. Pat. No. 8,150,664 issued on Apr. 3, 2012, which is a continuation of U.S. application Ser. No. 11/140,109 filed on May 27, 2005, now U.S. Pat. No. 7,516,052 issued on Apr. 7, 2009, which claims priority to U.S. Provisional Application No. 60/575,655 filed on May 27, 2004. Each of the patent applications identified above is incorporated herein by reference in its entirety to provide continuity of disclosure.

FIELD

This disclosure relates generally to software architecture for the simulation of physical entities. In particular, this disclosure relates to an object-oriented container-based framework architecture for simulating the function and position of physical entities in a time domain on a distributed computer network.

BACKGROUND

A software design framework is an architectural pattern that provides an extensible template for applications within a domain. In the context of object oriented computer software, a framework provides a set of abstract and concrete classes that can be extended via sub-classing or used directly to solve a particular problem within a particular domain. A set of objects from the classes then works together to carry out responsibilities within a particular problem domain or family of applications.

One of the problem domains in simulators is the simulation of physical objects that can present a video image to an operator. For example, military aircraft carry sensors that can detect objects based on their temperature. This allows the pilot to detect and track vehicles, personnel, and anything else with a heat signature during both daylight hours and darkness.

A simulation for such a vehicle will require a way to generate these images and get them into the operator stations for presentation. While many solutions exist for the image generation part of the problem; the challenge has always been how to combine the video with other graphical symbols and transport it to the desired destinations.

Traditionally, the combination and transportation of the video has been accomplished by an often complex arrangement of analog video mixing equipment, requiring special hardware, long runs of video cables, and as a side effect forcing the simulator into a fixed, non-transportable hardware arrangement. Further, this approach tends to restrict the number of viewers who are able to see the video. For example, it may be desirable to see the video both in a cockpit and also at an operator station. However, when the image is needed in a new physical location, another run of video cables is required.

The prior art has attempted to solve this problem with limited success. For example, U.S. Patent Publication No. 2013/0147819 to Dharmapurikar discloses a method and mechanism for rendering graphics that can utilize both server-side rendering and client-side rendering. The method includes the steps of identifying graphics commands associated with visual data, determining a relative efficiency for transmitting the visual data as pixels from server to a client, sending the visual data to be rendered on the client when the relative efficiency meets or exceeds a threshold value, and rendering the visual data on the server when the relative efficiency is below the threshold value. However, the mechanism and method in Dharmapurikar does not provide video streaming in a container-based architecture.

Statutory Invention Registration No. US H2201 to Stytz, et al. discloses software architecture for enhancing rapid prototyping in distributed virtual environments such as aircraft training simulators. The architecture in Stytz consists of "pallets" and "slots". Pallets relate to the location inside a "container" where information relating a specific object is located. "Slot" relates to the location of a specific piece of information within the "pallet". However, the container of Stytz cannot communicate with other containers nor is it capable of communicating with a views container. Further, the architecture in Stytz cannot graphically display information from objects or from a video stream.

The prior art does not disclose or suggest an object oriented framework or container based architecture for the description and manipulation of models of physical entities in the time domain as disclosed. Moreover, the prior art does not disclose the use of an object oriented framework or container based architecture to define a flight simulator over a distributed computer network as disclosed. Further, the prior art does not disclose or suggest an object oriented framework or container based architecture to stream video in a simulation.

SUMMARY

The present disclosure provides a container-based software architecture having an object-oriented simulation framework and containers for providing realistic simulation environments for physical entities in a time domain over a distributed computer network.

The present disclosure provides a software architecture that can be used to realize a simulation for any group of arbitrary entities and their environment or surroundings as related to time. The simulation is a collection of entities all operating together in a virtual environment. The architecture is a framework for the description of physical motion of and interaction between the physical entities. The present disclosure also provides an environment for the operation of software application components and specific graphical and motion input hardware and communication services that support them.

The present disclosure provides for streaming video in a container-based software architecture for simulation of physical entities. The present disclosure provides a container-based architecture for simulation of physical entities in a time domain. A simulation container is provided which provides an execution environment for "plug-in" components that cannot execute alone. The container also provides a "receptacle" for the plug-in components. The simulation container provides a run loop management service, an event posting service and a network data reflection service. One or more views containers are also provided which provide services related to generating and displaying graphical images. Three types of views containers are provided in the disclosure operator console view, a mission overview view and one or more cockpit views. A participant is provided, defined by a plug-in, which is a subclass of the simulation container and may be a subclass of a views container. When instantiated, the participant instance is added to a running simulation container. Thereafter, the participant instance's life cycle is managed by the simulation container until such time as either the participant expires or the simulation container itself expires. Participants can be "entities" or "non-entities" (or "controllers"). Entities are models (either real or imaginary) of physical things. Non-entities or controllers are provided for collection of physical data from mechanical user input devices and manipulate data for entities or other network communication tasks. A participant communicates with the simulation container and the views container through interfaces. A simulation container interface is the interface any participant must implement in order for its life-cycle to be managed by a running container. A views interface is the interface any participant must implement in order for graphical displays to be generated and presented on various monitors on the network. Examples of information display include the number, type and location of participants and background to be generated by the running simulation. An environment subclass is instantiated which creates environment characteristics for the simulation.

An image generator object encodes and compresses a video image in parallel using a GPU for delivery to the simulation container. The simulation container redirects and multi-casts the compressed video image to a set of view containers. Each view container uses a local GPU to decompress and present the video image for combination with other graphics.

An environment interface is provided which allows definition of environment objects to be submitted to the simulation container. A user interface station is provided which allows interaction with the system by a user and provides for collection of physical data from mechanical user input devices.

A scenario generator is provided to set initial parameters for participants and choose various participants from a set of possible simulation participants to participate in a simulation. Code which defines the available participants is stored in a library. The participants are stored as "plug-ins" which contain the implementations of classes that define the interfaces needed to communicate with the containers and other participants and the code needed for the participant to carry out its functions in the simulation. An inspector interface is provided which provides a means to change or monitor participant data.

The disclosure further provides for downloading the library of participant plug-ins from a local area or wide area network, thus extending the simulation environment while running. A scenario loader is provided that instantiates at least one simulator container class and all participant subclasses.

In one embodiment of the present disclosure the simulation environment is based on an aircraft flight simulator. An example of a participant in this embodiment is an aircraft. A plug-in defines each aircraft including methods which define the aircraft. One such definition is an aircraft model. The aircraft model comprises an airframe, control surfaces, engines, fuel system, onboard systems, pilot input, and other features necessary to operate. The aircraft participant also requires an environment in which to operate. The environment includes air density, weather and gravity. The disclosure provides a simulation container which provides necessary services to allow the participant entity to function in the environment.

One of many great advantages that are provided by the architecture of the present disclosure over the prior art is that it allows extensibility and scalability of the simulation system through addition of plug-in components and receptacles which allow expansion and changes to occur without rewriting the software which implements the simulation.

Other features will be or become apparent to one with skill in the art upon examination of the drawings and detailed description. It is intended that all such additional features be included within this description, be within the scope of the present disclosure, and be protected by the accompanying claims.

BRIEF DESCRIPTION OF THE DRAWINGS

Many of the aspects of the disclosure can be better understood with reference to the following drawings. The components in the drawings are not necessarily to scale, emphasis instead being placed upon clearly illustrating the principles.

FIG. 10 is a display representation of an example of a distributed interactive simulation (DIS) controller view.

DETAILED DESCRIPTION

Figure 1:
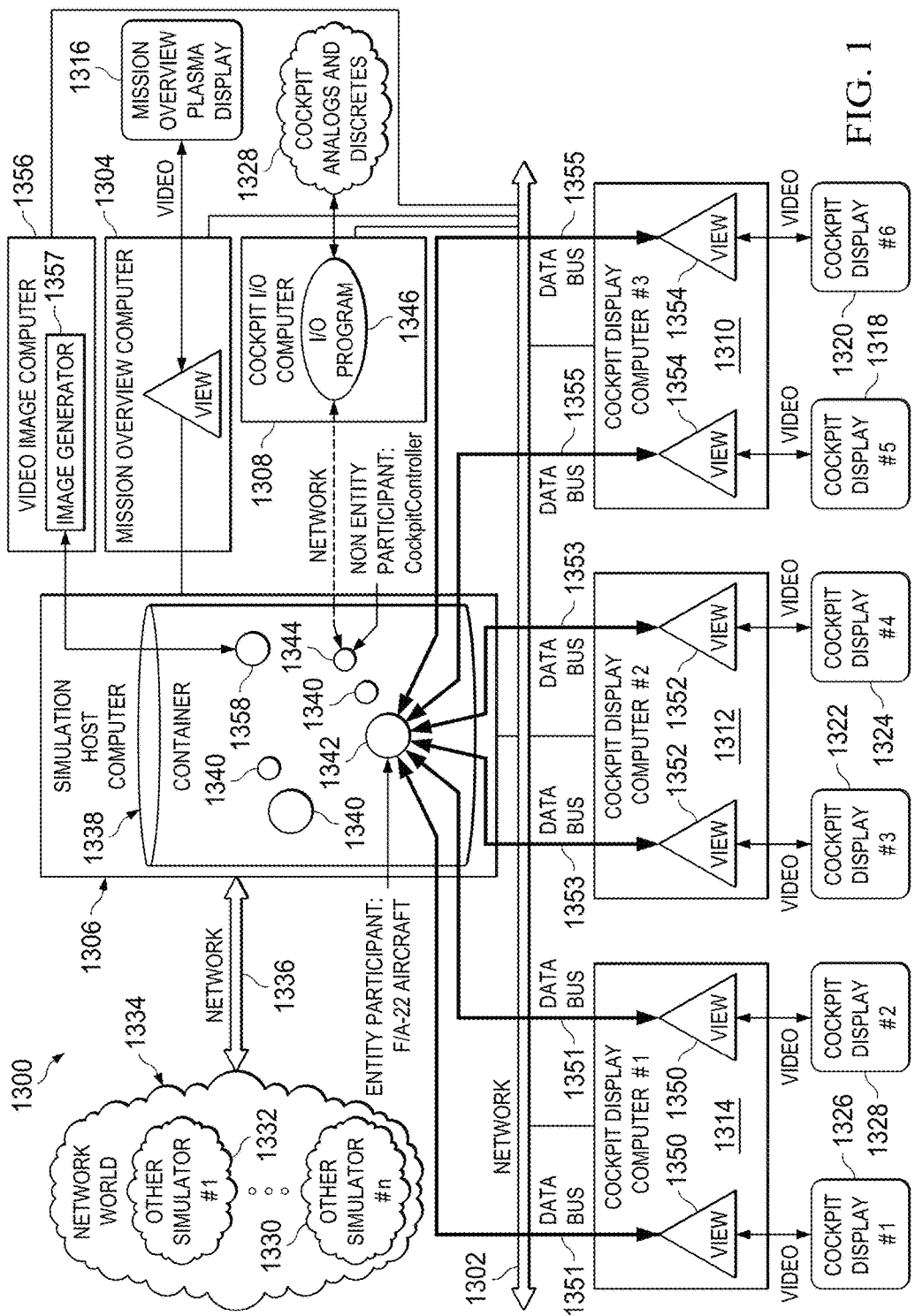
FIG. 1 is a schematic diagram of the network and software architecture provided by the present disclosure.

The following discussion is presented to enable a person skilled in the art to make and use the disclosure. The general principles described may be applied to embodiments and applications other than those detailed below without departing from the spirit and scope of the present disclosure as defined by the claims. The present disclosure is not intended to be limited to the embodiments shown, but is to be accorded the widest scope consistent with the principles and features disclosed.

The following definitions are used throughout this application as relating to object-oriented design of computer software:

"Class" means a collection of data and executable code that together defines a model or template of a concept or physical thing. A class is a blueprint, or prototype, that defines the attributes and methods common to all objects of a certain kind. A class definition ensures all objects of a class will have the same structure and behavior. Classes can be aggregated hierarchically to build complex models.

"Inheritance" is a property of classes that allows subclasses to inherit public attributes and methods code from other classes. Inheritance defines a level of hierarchy among classes and facilitates defining objects in terms of other objects.

"Superclass" means a class from which other classes inherit attributes and methods.

"Subclass" means classes that inherit attributes and methods from other classes.

"Instance" means a single distinct object of a class. Just as a class can be thought of as a template for objects to be created, instances can be thought of as created objects.

"Instantiation" means the creation of objects whose functions and characteristics are determined by associated class definitions.

An "object" is a group of attributes and related methods. An object is the actual representation created from a class, and is the result of instantiation. When an object is created a usable instance of a class is created and is stored in memory.

"Method" means executable operations that can be performed against either a class or an instance. It is a function associated with an object.

"Interface" means a device that allows objects to communicate with each other or with a class or container into which it is instantiated. An interface defines a set of methods without defining their implementation.

"Plug-in" is a subset of code, such as binary files, that implements the methods of an interface. A plug-in is an extension mechanism that allows new types of participants to be added to a container through implementation of predefined interfaces.

The following definitions are used throughout this application as relating to the simulation problem domain in terms of a container and contained objects:

"Container" means an execution environment for objects that cannot execute in a standalone mode.

"Entity" means a type of simulation participant or object that serves as a superclass for models of real or imaginary physical things (e.g., aircraft, sea vessels, land vehicles, radar emission energy, and radio waves).

"Environment" means a description of the virtual world within which entities execute.

"Non-entity" means an object that is a simulation participant with tasks defined for communication with network hardware or other activities not directly related to entity interaction during a running simulation.

"View" means a way to examine a simulation container and/or its contained participants.

"Data bus" means a commonly accessible data block through which logical data is shared between entities and containers.

The preferred implementation of the container architecture and system design provided by the present disclosure is shown in FIG. 1 at 1300. A network 1302 is connected via Ethernet to a mission overview computer 1304, a simulation host computer 1306, a cockpit IO computer 1308, a cockpit display computer 1310, a cockpit display computer 1312, a cockpit display computer 1314, and a video image computer 1356.

Mission overview computer 1304 is in turn connected to mission overview plasma display 1316. Cockpit display computer 1310 is connected to cockpit displays 1318 and 1320. Cockpit display computer 1312 is connected to cockpit displays 1322 and 1324. Cockpit display computer 1314 is connected to cockpit displays 1326 and 1328. Cockpit IO computer 1308 is connected to cockpit analog devices 1328.

A simulation host computer 1306 maybe connected to other simulations 1330 and 1332 in external network 1334. Network connection 1336 communicates through a TCP/IP protocol as known in the art.

Simulation host computer 1306 supports container 1338 in which are instantiated multiple objects 1340, entity participant 1342, non-entity participant cockpit controller 1344, and non-entity participant image generation ("IG") controller 1358. Non-entity participant cockpit controller 1344 communicates via network 1302 to input/output program 1346 running on cockpit IO computer 1308. IO program 1346 controls receipt and organization of information from cockpit analog devices 1328. Entity participant 1342 is also instantiated in view containers 1350 running on cockpit display computer 1314 and communicates data to the view container through data buses 1351. Entity participant 1342 is also instantiated in view containers 1352 and 1354 running cockpit display computers 1312 and 1310, respectively. The participant communicates data to these view containers through data busses 1353 and 1355.

Non-entity participant IG controller 1358 communicates via network 1302 with image generator object 1357 running on video image computer 1356 and with view containers 1350, 1352, and 1354, as will be further described below. Image generator object 1357 communicates data to nonentity participant IG controller 1358.

Various different computers can be logically grouped into an operator station. With respect to FIG. 1, an example of an operator station is the grouping of cockpit IO computer 1308 and cockpit display computers 1310, 1312 and 1314. In another embodiment, an operator station may include cockpit IO computer 1308, cockpit display computers 1310, 1312 and 1314, and video image computer 1356. In one embodiment, the video image computer is remotely located and accessed via the Internet through network 1302. An operator station may include multiple computers, displays and input devices that are considered a single logical object.

Physical computers and logical organization of the software running both before and during a simulation need not be located on separate computers. For example, containers, participants, analog devices and displays may be logically connected in the same groupings and functions as physical groupings and functions, but are not required to be.

Figure 2:
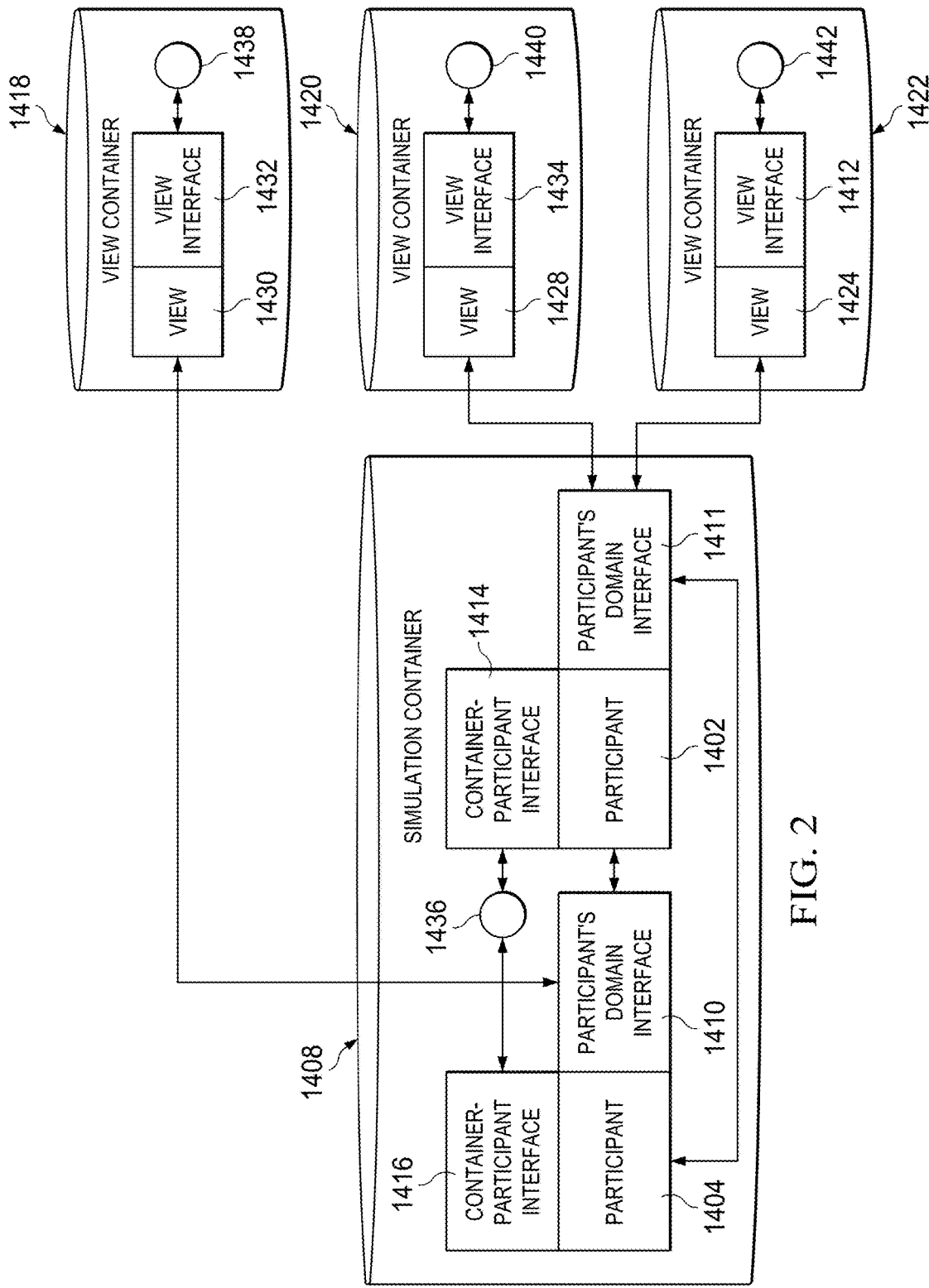
FIG. 2 is a schematic depiction of the logical relationship between participants, interfaces and containers.

Referring to FIG. 2, the logical organization between participants, interfaces and containers is shown during run time of the simulation container.

Simulation container 1408 includes participants 1404 and 1402. The code for participant object 1402 includes container-participant interface 1414 and participant's domain interface 1411. Container-participant interface 1414 includes methods which allow communication of participant 1402 with simulation container 1408 indicated schematically by connection point 1436. Similarly, participant 1404 communicates with simulation container 1408 through methods contained in container-participant interface 1416 at contact point 1436. Participant 1404 communicates with participant 1402 through methods defined in participant's domain interface 1410 and participant's domain interface 1411. Participant's domain interfaces 1410 and 1411 define sets of rules that are used by the participants to provide information to each other and to other participants and entities operating in simulation container 1408. Participant's domain interfaces 1410 and 1411 are not necessarily predefined but must be consistent between participant 1402 and participant 1404 in order to be implemented.

Container participant interfaces 1416 and 1414 provide methods which participants 1404 and 1402, respectively, must adhere to in order to join or be instantiated into simulation container 1408.

The code which defines each participant, container participant interface and participant's domain interface may also contain code which is used to instantiate view objects in view containers. Once instantiated, the view object communicates with its originating participant through its associated participant's domain interface. With reference to FIG. 2, participant 1404 includes code which instantiates view 1430 within view container 1418. View object 1430 communicates with view container 1418 through view interface 1432, as shown schematically by connection point 1438. View interface 1432 includes methods which are required for instantiation of view object 1430 into view container 1418.

Each participant may include code which instantiates more than one view object in more than one view container.

Referring still to FIG. 2, participant 1402 includes code to instantiate view object 1428 within vim container 1420 and view object 1424 within view container 1422. Participant 1402 communicates with view object 1428 and view object 1424 through participant's domain interface 1411. View object 1428 communicates with view container 1420 through view interface 1434 shown schematically as connection point 1440. View interface 1434 includes methods which are required to instantiate object 1428 in view container 1420. View object 1424 communicates with view container 1422 through view interface 1412 as shown schematically by connection point 1442. View interface 1412 includes methods necessary to instantiate view object 1424 in view container 1422.

Many container classes are provided by the preferred embodiment. Examples of these are a simulation container class, a graphical participant interface class, an operator console class, a mission overview class and the scenario generator class.

The simulation container class accepts plug-ins which define simulation participants in the simulation according to the simulation container interface.

The graphical participant interface accepts plug-ins that are graphical views associated with a simulation participant. Graphical participant interface plug-ins comprise views to be displayed by the graphical participant interface container class. A display method plug-in is also provided to the mission overview and scenario generator classes which are implemented by the appropriate interface and defined how data is to be displayed.

The operator console container class accepts plug-ins for each given type of participant. The operator console container class also accepts inspectors for the simulation participants. The inspectors provide methods to directly interact with participant data that are not available through the graphical participant interface view.

The mission overview container class accepts plug-ins for each given type of participant.

Mission overview has a simulation container class that provides communication with the mission overview view(s). In this class' willAddParticipants method, each new participant is checked for existence of a MISSION_OVERVIEW_CLASS_NAME resource. If one is available, the class name of this resource class is sent to the view and associated with the new participant. The mission overview view class then loads this resource class by name to use in rendering that participant in mission overview.

As the container continues to run, the mission overview container class uses the provided resource class for each participant to send updates to the view(s).

The mission overview container class also accepts inspectors for the simulation participants.

The inspectors provide methods to directly interact with participant data that are not available through the graphical participant interface view.

The scenario generator container class provides services which allow definition of a simulation scenario.

Figure 3A:
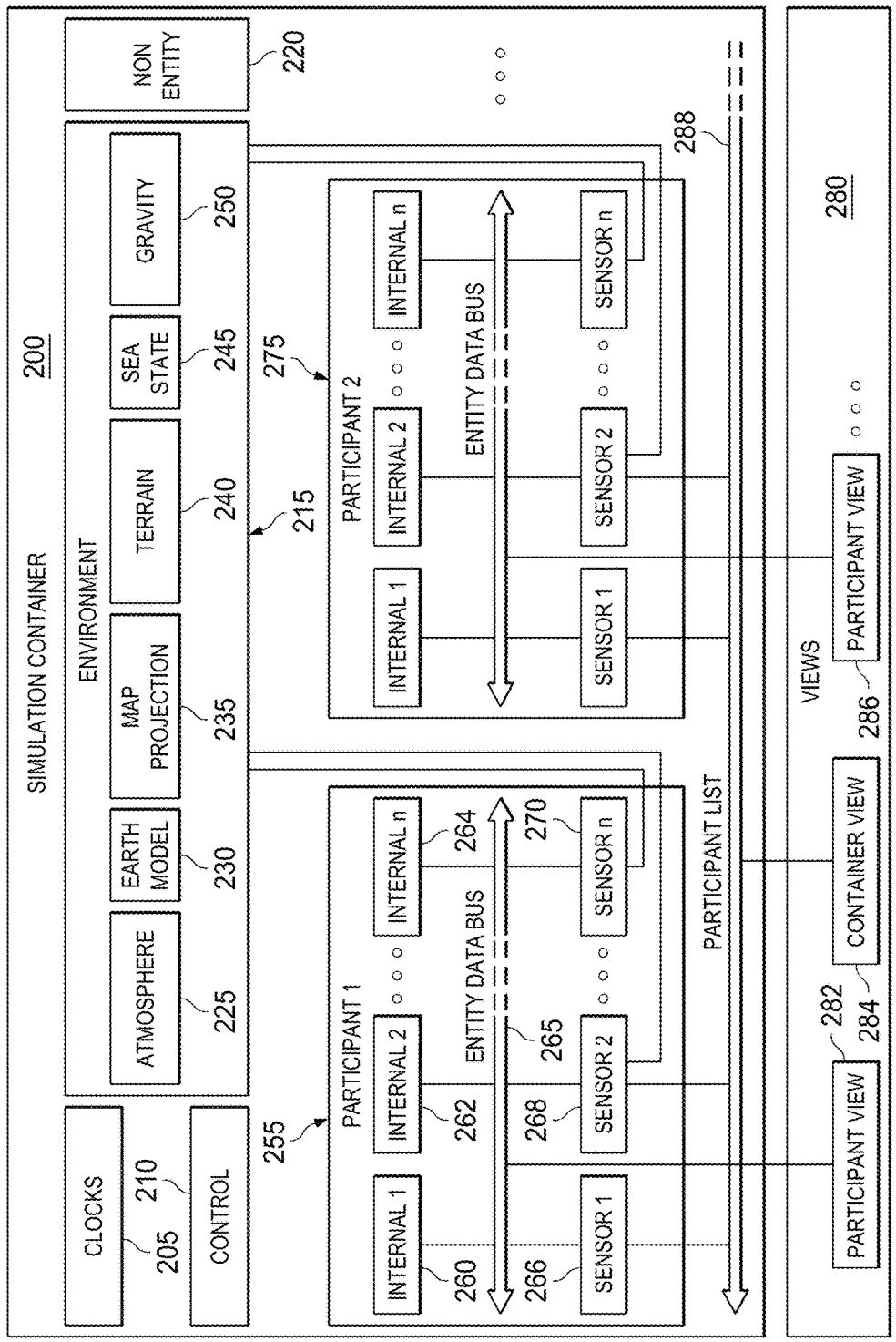
FIG. 3A is a schematic depiction of an example of a simulation container and associated views according to the present disclosure.

Referring to FIG. 3A, a diagram of an example of one embodiment of an object oriented simulation container 200 is shown. Simulation container 200 defines an execution context for instances of the simulation participant superclass. The instances include a plurality of plug-in components that model specific concepts from the simulation problem domain. Simulation container 200 includes two examples of simulation participants 255 and 275 but of course can contain others. Simulation container 200 provides life-cycle management for its contained simulation participants 255 and 275, provides access to a virtual environment 215 in which participants 255 and 275 interact within the simulation, and provides general utility services that allow participants 255 and 275 to interact with each other and the outside world. General utility services include the coordination of the simulation clock 205 provided to all members of the simulation participant class, as well as coordination of the master loop. The simulation container provides a master loop in which each entity and participant is repeatedly advanced a single time step in processing and allows for individual updates of each data bus within each participant and entity. Simulation container 200 also provides a participant list 288 to track the number and identity of participants such as 255 and 275. The present disclosure does not place a limit on the number of participants that are possible. Therefore, the number of participant(s) is only limited by the capacity of the computer system on which the simulation is running.

Simulation container 200 provides methods to enable list based processing. List based processing is a method for organizing active participants identifiers or handles in an open ended list. Each participant has write-protected access to the participant list and can access public information about other active participants.

Simulation container 200 also maintains subsets of the main participant list based on categorization criteria such as class membership or property evaluation. The categories are updated as participants are created and destroyed in the simulation container. For example, an entity participant such as a ground based radar system may only be designed to report entities which are categorized as air vehicles. The simulation container can create and maintain a subset of the main participant list which meets the criterion of air vehicles. If further entities are created which request access to the category for the same criteria, access is provided by simulation container 200. The method of categorization within simulation container 200 prevents each participant from being forced to maintain potentially duplicate participant subset lists.

Simulation container 200 also provides a general utility service of publishing and subscribing events known as the publish/subscribe method. Simulation container 200 maintains an "event center" which is a memory location controlled by a method of the simulation container class. The event center serves as a "bulletin board" where participants can register to be notified when events take place. When an event of interest takes place, the publish/subscribe method of simulation container 200 notifies registered participants who in turn calculate the effect of the event and how the event is interpreted. The publish/subscribe method contributes to extensibility of the simulation system by isolating the participant that posts a notification from a list of recipients of the notification. Extensibility is enhanced because new participants that require information as to certain events can be added to the simulation by simply registering to be notified as opposed to determining and informing each entity object responsible for generating an event that the new participant is present.

Simulation container 200 also provides the general utility service of an execution sandbox. The execution sandbox method provides that operations carried out by a participant are contained within the participant sandbox so that error conditions are isolated. For instance, if a participant encounters a fatal error, it is removed from the container to avoid affecting other participants. Examples of fatal run-time errors include inability to communicate with essential components, or the communication errors between objects using instantiated methods or network communications using instantiated communication objects.

Simulation container 200 also provides a "life cycle interface" between itself and instantiated participants. The life cycle interface includes the control class 210 which defines methods which control instantiation of objects, error handling and object termination procedures. The life cycle interface also defines methods for notifying a participant that it is about to be added or removed from the container or that other participants are about to be added or removed from the container. The life cycle interface is also responsible for informing participant objects when to perform routine updates and notifying participants that the container is about to terminate operation.

Life cycle termination of an object can be determined by the function of the object. With reference to participant 255 and/or 275, life termination is calculated by methods within the participant entities. At the appropriate time for termination, the participants communicate to the simulation container through the interface that the life cycle has been completed and would like to be terminated. The simulation container responds by terminating the object during the next cycle pass. Additionally, termination of an object can be required by the closing of simulation container 200 such as in the occurrence of shutting down the simulation completely or reloading a different simulation. In this instance, the simulation container communicates a potential life cycle termination to the participant through a life cycle interface. The participant, through methods particular to itself, completes its life cycle by closing files and terminating network connections. The simulation container then terminates the entity and updates participant list 288 by removing the identifier for that participant.

Simulation participants are designed to represent objects that interact with other entities and/or participants. In the present embodiment the objects are physical objects, but they are not necessarily required to be so. For instance, in the case of electromagnetic waves, no physical object exists to model but the presence and interaction of the electromagnetic wave can be represented by a participant. Another example is an imaginary "warp" in time or space modeled by a static space with differing constants for gravity and time calculation than those found in other areas of the environment and defined by coordinates in the environment. Simulation participants are controlled by the simulation container and have access to environment objects that change over time. Simulation participants 255 and 275 are instantiated and removed by methods within simulation container 200. Simulation participants have the capability of interacting with environment object 215. Participants 255 and 275 maintain sufficient data and methods to perform functions particular to participant as relative to its function with the problem domain and perform routine updates of memory locations containing data relative to the participants function. Routine updates are triggered by simulation container 200 on a systematic basis through the master loop.

In a preferred embodiment, routine updates are triggered 60 times a second. In other embodiments, the updates are triggered at other rates and may be varied on a per scenario basis or dynamically changed based on external commands.

When a routine update trigger is received by a participant, each method and data bus is updated. For example, in a participant which models an aircraft, methods are necessary to determine how the aircraft moves given the environment variables of gravity, thrust, air density and control surface position. In this example, the participant contains methods that describe an aircraft as a free body with a defined position space. The motion of the free body is defined by stored equations of motion that have variables of position, velocity, and acceleration. Equations modeling various forces which act on the free body such as gravity, pressure differentials across control surfaces and mechanical stresses to the airframe are also defined by methods in the participant. Data such as position of the free body in space, velocity and acceleration are calculated recursively and stored in a local database known as a data bus. The information stored in the data bus once updated becomes static until the next routine update trigger is received and is available to those other participants and the container as necessary.

When a simulation object is created, it may register the resource to be used for its representation within a view container class using setResource and a resourceName defined for use by that view. If no resource is defined, then that simulation participant is not depicted in that view. For instance, a behavioral plug-in would not have a representation in the mission overview display, so the resource for mission overview in that case would be left unset.

This mechanism allows defining more complicated representations as the objects simulated become less abstract. An F-16 fighter participant will load a resource class into the resource map which will display an F-16 icon. During initialization, this resource replaced earlier resources that were loaded as the super classes were constructed. As an example, the F-16 resource would replace the more generic fighter resource, which replaced the even more generic airplane resource.

In the event a participant fails to change its resource, the superclass' resource assignment fills in. So, if a new F-YY fighter were added that didn't assign its own resource, the resource specified by the fighter superclass would be used.

Other embodiments might include different participants. For example, in a participant which represents an industrial robot, examples of methods and data buses to be updated might include the position, velocity and acceleration of various members of a robotic arm given the equations of motion for the robot and the input of activation time, horsepower and rotational speed of mechanical actuators at each joint. In this example, the data bus might contain information such as location of each mechanical robotic joint and/or member as well as the deflection of a mechanical member upon indicated "contact" with other participant entities.

Other examples of methods and data buses to be updated within a participant might include the height, weight and leaf area of plants within a hypothetical growing space given the equations of growth and proliferation for a plant species and the input of sunlight intensity, season and available moisture. In this example, the data bus might contain information such as evaporation rates through leaf surfaces, stem thicknesses and maturity rates of the participant, as well as the effect of the participant on other participant entities.

Other examples of methods and data buses to be updated within a participant might include a proliferation of disease and mortality rates within a hypothetical disease culture given a population of participants with specific infection rates and the input of nutrition, anti-disease agents and environment factors such as temperature and precipitation. In this example, the data bus might contain information such as number of living entities, health of living entities and survival rates as well as the effect of each participant on all other participant entities.

In a preferred embodiment, examples of simulation participants 255 and 275 include stationary objects (such as buildings) ships, vehicles, aircraft, and rockets. In other embodiments, examples of participants could be medical sensing equipment and medical procedures, industrial applications such as robotic motivators and systems, plants, underwater vehicles and theoretical entities such as disease infestations in a horticultural environment, time capsules and faster than light vehicles. In yet another embodiment, participants might be invisible "warps" or "waves" in space, time or gravity that are present in an environment at static or dynamic coordinates and which affect other participants that pass into or near them.

Simulation container 200 also includes non-entity objects 220. Non-entity objects 220 drive external physical functions of the simulation and communicate with hardware drivers that in turn communicate with hardware devices. The non-entity objects have attributes which identify external devices and methods which prepare and time data for transmission to external devices and methods which interpret and translate data received from external devices. Non-entity objects also coordinate certain simulation functions such as scenario control. Examples of non-entity objects include controllers for external devices such as image and audio generators and scripting engines. Scripting engines are lists of instructions or methods which are repeated actions to be taken by various participants and environment objects to create a situation or scenario. Non-entity objects also may contain strings to locate files containing methods to execute at start-up and code to execute computationally expensive tasks.

Another example of a non-entity object is a bridge participant. In general, a bridge participant implements an external specification in order to "glue" the simulation container to data provided to the simulation container. For example, the bridge participant is an interface to a public network protocol such as the Distributed Interactive Simulation (DIS) protocol (IEEE 1278.1 and 12781a and all future amendments). DIS protocol provides communication between simulators who have adopted the protocol. Other types of external specifications may be employed.

In a preferred embodiment, non-entity object 220 is a software-based router. In this embodiment, the software-based router includes methods that mimic a hardware router by redirecting incoming data packets to other computers in the network. In this embodiment, non-entity participant 220 is instantiated at the time simulation container 200 is instantiated.

In a preferred embodiment, the data packets include a video stream. In this embodiment, the video stream includes a thermal image view of a target. In this embodiment, the video stream is sent to each participant view for display, as will be further described below. In another embodiment, the data packets include a still thermal image view of the target. In another embodiment, a set of still images are employed. In other embodiments, any data may be employed.

FIG. 3A further depicts participant sub-entities including internal objects, sensor objects and data bus objects. Such objects function to coordinate simulation domain data and information with functions or methods of the participant. For example, Sensor1 266, Sensor2 268, and Sensorn 270 of participant 255 are internal objects. The sensors may be entities with other logical classes disposed within them. For example, in an aircraft embodiment, the sensors may include infrared sensors for infrared search and track systems, radar, and any other sensor. Similarly, participant internal objects depicted as Internal1 260, Internal2 262, and Internaln 264 are also capable of having methods and other classes logically disposed within them.

In a preferred embodiment, sensors 266-270 within participant 255 function in relation to the simulation domain as collectors of "truth data" that exists within the simulation. Sensors 266-270 gather related information as to aircraft radar, aircraft target pods, target data, aircraft weapon pods, and aircraft navigation pods, fire control radars, weapon/stores management systems, fuel systems, countermeasure systems, and navigation systems. In this specific example, the truth data is the relative position of one or more targets detected by the radar to the position of the aircraft free body. The sensor object gathers the data by posting itself as an interested entity on the publish/subscribe list of the simulation container class. It is then updated as to the presence of events such as target creation and location. A sensor may also gather data by accessing the participant list maintained by container 200 to determine which of the participants are within its range for viewing the sensor object then may present this information back to the participant entity or internal object through the data bus.

In one embodiment, any of sensor objects 266, 268, and 270 gathers the target data by posting itself as an interested entity on the publish/subscribe participant list 288 and processes the target data for display in the participant view as will be further described below. In this embodiment, any of sensor objects 266, 268, and 270 represents infrared sensor that detects a heat signature of a target.

In alternate embodiments, routine information, such as updated positions of entities of interest, is gathered by the sensor simply requesting to be an observer of certain events. For example, simply observing the participant list for updated positions of the entities of interest.

Of course, examples of sensors can exist outside of the aircraft simulation arena. For instance, sensors in the medical field and industrial fields can be substituted with appropriate methods and subclasses to function in an appropriate environment in a time domain. An example is a heart monitor or pressure sensor. Sensors in the botanical field might report presence or absence of rain, light of freezing temperature and the presence or absence of chemical agents.

Internals 260-264 function to produce a filtered view of the truth data gathered by simulation sensors 266-270. In the preferred embodiment, internals 260-264 include methods that modify the truth data. Filter methods can overestimate or underestimate the truth data to more closely model the physical situation that they represent. For example, in the preferred embodiment although an aircraft radar sensor may reflect truth data of a certain number of enemy surface-to-air missiles, it may be desired for the simulation aircraft's radar system to display less than the total number, thereby artificially indicating fewer threats to the aircraft participant. Modified truth data is communicated to the participant through updates to the data bus.

Simulation container 200 also includes environment class 215. Environment class 215 operates as an object within simulation container 200 along with the objects within it to inherit certain functions and methods. Environment objects provide methods, functions and constants which are grouped in related physical objects. In one embodiment, objects of environment class 215 operate as an atmosphere 225, an earth model 230, a map projection 235, terrain 240, a model of the sea state 245 and gravity 250. The environment objects remain a part of the simulation container 200 for the duration life-cycle of the specific simulation. Each of the objects of the environment class can of course contain finer rained aggregations. For instance, gravity object 250 can merely be a constant such as 9.8 m/s$^2$. However, gravity object 250 can also include a lookup table varying gravity relative to position or altitude with respect to earth model object 230 and/or other static and dynamic factors related to a time or space domain.

The environment objects act as services that provide data to simulation participants upon request. Environment objects update their specific object properties upon receipt of a routine update trigger provided by the simulation container. The environment objects may be modified in appearance or number during a simulation and also may be replaced or removed. However, at least one environment object must be instantiated in the environment class. Environment objects may change over time or with respect to spatial coordinates or composition. For example, the characteristics of the atmosphere 225 may change as a function of time of day and the terrain 240 may change due to the resultant detonation of a munition explosion from a dropped ordinance from a simulation aircraft or other participant.

The present disclosure is not limited to environment objects specifically relating to an aircraft simulation. One example of such an alternative environment could be an environment modeling physical properties of nano-machine environments, medical environments, horticulture environments and imaginary environments. The alternative environment objects should have functions and variables that define environment specific types that can be updated, queried and utilized by participants and other entities operating within simulation container 200.

Each participant communicates internally through data bus 265. Data bus 265 is an intra-entity data memory block that centralizes internal data needed for operation of the participant. The data bus is encapsulated in the participant class but may be mirrored to support other objects' needs. For example, the data bus is used to support view objects outside simulation container 200. In this example, a set of multi-function display interfaces running on a computer outside container 200 can communicate with sensor objects that feed data to participant object data buses running in simulation container 200.

FIG. 3A further depicts views container 280 including participant view object 282, container view object 284 and participant view object 286. A view may show information about the entire simulation container or a single participant within the container. The number of views that can simultaneously interact with a given container 200 are restricted only by available network bandwidth, and the rate at which participants in the container can prepare, send, and receive data. Participant view object 282 provides the graphics generation attributes and methods to depict the location and interaction of participant 255 operating simulation container 200 through the graphical participant interface. Similarly, participant view object 286 is responsible for depicting the activity and interaction of participant 275 in a simulation running within simulation container 200. In the preferred embodiment, each participant within simulation container 200 can have zero or more associated participant view objects located within views container 280. The preferred embodiment prescribes no limit to the number of participant views for each participant nor does it prescribe a limit on the number of participants which can cooperate in a simulation operating within simulation container 200.

Container view object 284 provides methods and attributes to display a graphical depiction of the activities of all participants participating in the simulation which are registered on the participant list 288 simultaneously.

Figure 3B:
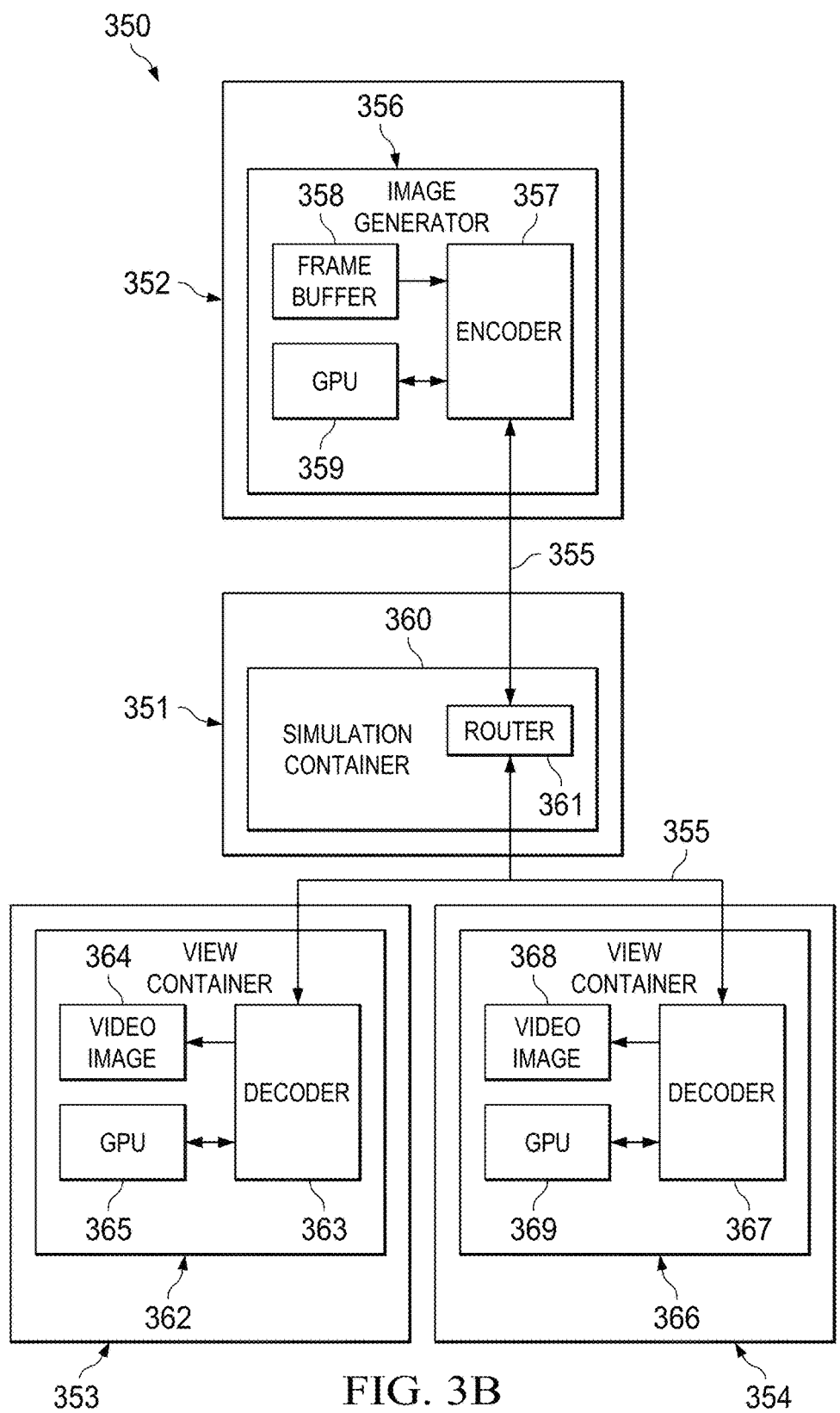
FIG. 3B is a schematic depiction of a simulation container, an image generator object, and a view.

Referring to FIG. 3B, video stream processing system 350 for target data is shown. Video stream processing system 350 includes simulation computer 351 connected video image computer 352, and display computers 353 and 354 through network 355.

Encoder 357 of video image computer 352 breaks up the video image in frame buffer 358 of image generator object 356 into multiple parts and compresses the multiple parts of the video image in parallel by executing a first set of methods that utilize a set of software library calls of graphics processing unit ("GPU") 359. The video image in frame buffer 358 is now reduced into compressed parts, each of which will fit onto network 355.

Simulation computer 351 is running simulator container 360. The streamed video data arrives to simulation container 360 and router 361 "multicasts" the streamed data to n number of display computers. Router 361 sends the video data stream to decoders 363 and 367 of display computers 353 and 354, respectively, for decompression. Decoder 363 executes a second set of methods that utilize a set of software library calls of GPU 365 to decompress the data stream in parallel into video image 364. Decoder 367 executes a third set of methods that utilize software library calls of GPU 369 to decompress the data stream in parallel into video image 368. In one embodiment, the second set of methods and the third set of methods are the same. In other embodiments, the second set of methods and the thirds set of methods are different. Each of video images 364 and 368 is forwarded to view containers 362 and 366, respectively, and combined with other graphics, including the sensor object view to form a participant view in view containers 362 and 366 and presented to viewers on display computers 353 and 354, respectively.

In a preferred embodiment, encoder 357 is an H.264 encoder. In this embodiment, each of decoders 363 and 367 is an H.264 decoder. Any encoder-decoder compression-decompression format may be employed.

In one embodiment, router 361 is a non-entity participant. In another embodiment, router 361 is an intrinsic part of an entity participant, such as an internal object or a sensor object.

Video image computer 352 can be any personal computer known in the art including a processor, a memory, and GPU 359. In one embodiment, video image computer 352 is a server.

Each of display computers 353 and 354 can be any personal computer known in the art, each including a processor, a memory, and GPUs 365 and 369, respectively.

In a preferred embodiment, each of GPUs 359, 365, and 369 is a GeForce GTX TITAN Black GPU available from NVIDIA Corporation. Other suitable GPUs known in the art may be employed.

In preferred embodiment, the first, second, and third set of methods to utilize software library calls are written using the CUDA programming platform available from NVIDIA Corporation. Other suitable programming platforms and languages known in the art may be employed.

In a preferred embodiment, the video stream is a high definition video stream displaying a thermal image view of the target. In another embodiment, the target data is a still thermal image view of the target. In other embodiments, any multimedia data may be employed.

Figure 3C:
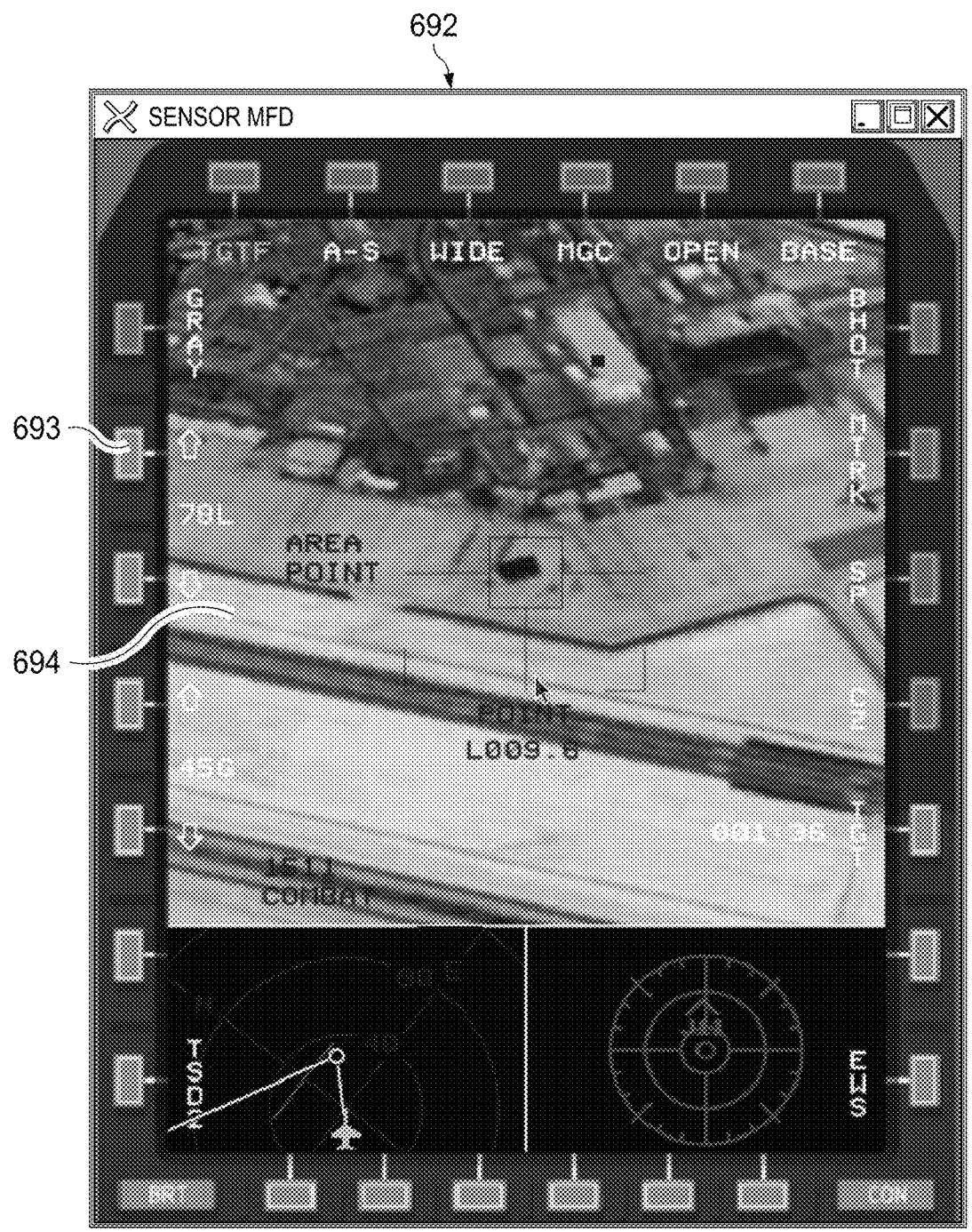
FIG. 3C is a display representation of a sensor multifunction display.

Referring to FIG. 3C, sensor multifunction display 692 includes graphical frame 693 and video image 694.

Figure 4:
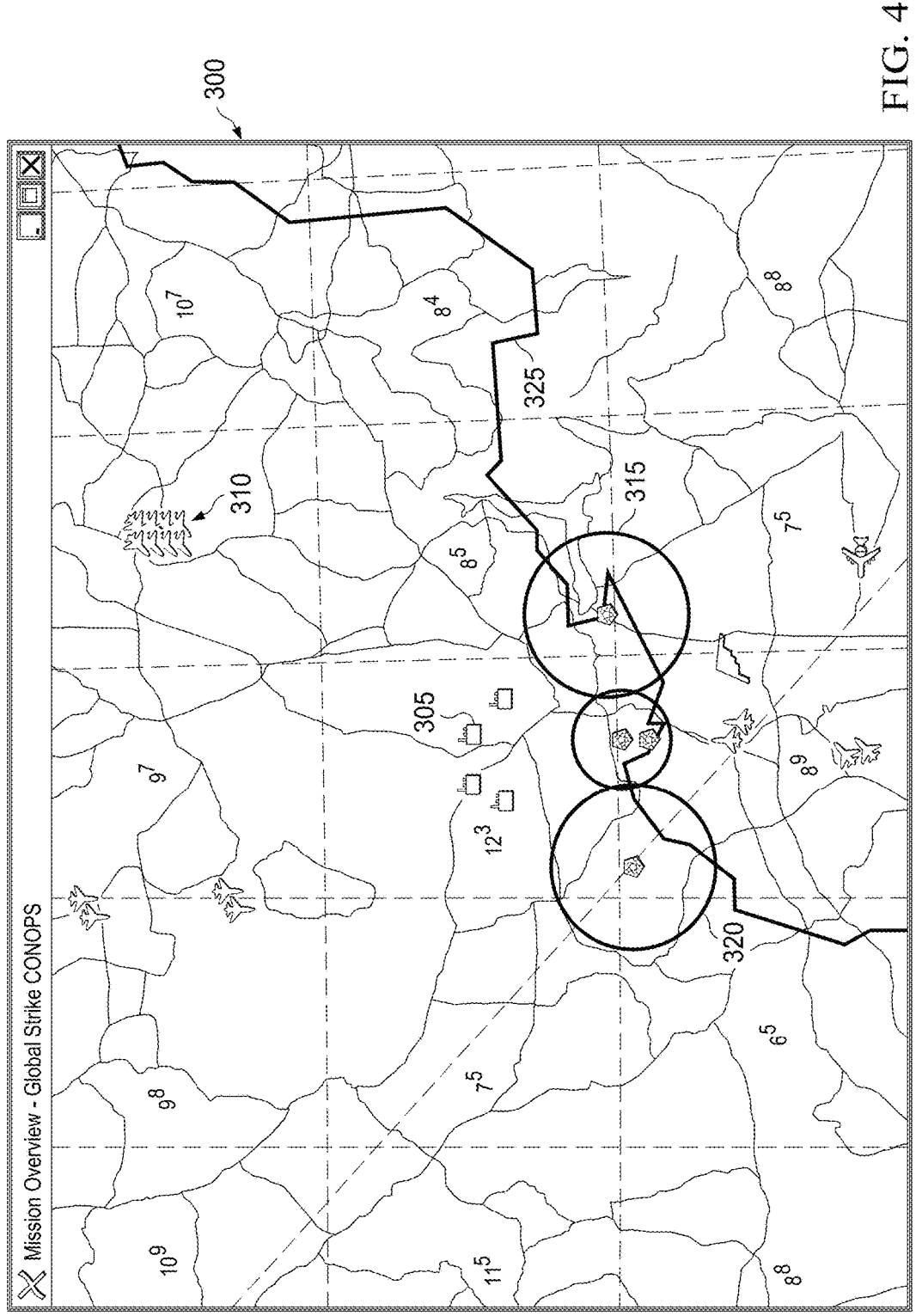
FIG. 4 is a display representation of an example of a mission overview view according to an embodiment of the present disclosure.

Referring to FIG. 4, an example of the graphic display provided by container view object 284 is shown as a mission overview 300. Mission overview 300 provided by container views object 284 depicts relative physical positions of participants within simulation container 200 in relation to a map of common space. The map is determined by a mission overview configuration. The map will have an associated conversion from latitude and longitude coordinates to the map coordinates. The map coordinates are used in conjunction with the positional coordinates provided by the participant to generate an associated icon in the view. In the pictured embodiment, physical positions of the participants are location, altitude and orientation of various aircraft participants. For example, the position of fixed target 305 and participant group 310 are shown in relation to each other. The map of common space in the preferred embodiment is shown as a terrain map image called by the Mission Overview class. Mission overview 300 provided by container views object 284 of the preferred embodiment also depicts relatives weapons ranges shown as circles 315 and 320 relative to a single participant object in hypothetical boundaries on the terrain map such as country border 325.

Figure 5:
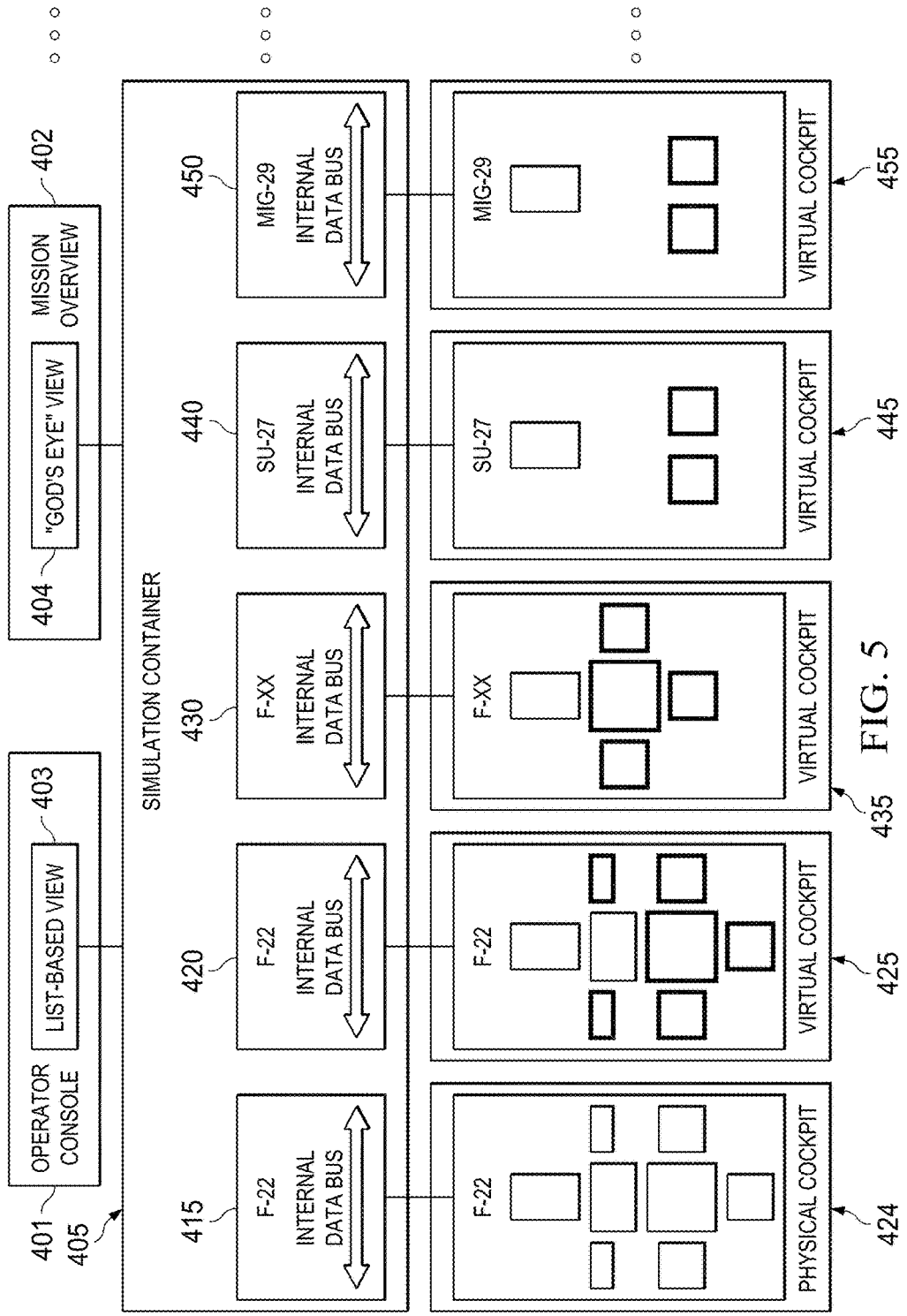
FIG. 5 is a schematic depiction of multiple view objects in communication with a simulation container.

Referring to FIG. 5, four types of views applications operating in communication with a simulation container are shown. Each of operator console container 401, mission overview container 402, a plurality of virtual cockpit views 425, 435, 445, and 455 and physical cockpit view 424 is in communication with simulation container 405.

In a preferred embodiment, the virtual cockpit views and physical cockpit views are containers for the display set of a single entity. Multiple virtual cockpits views 425, 435, 445, and 455, and physical cockpit view 424 can be active simultaneously, thereby providing a built-in manned control station and display repeater capability. Examples of display sets are shown for an F-22 415 and 420, F-XX 430, SU27 440, and a MIG-29 450. Each participant can provide an optional display set that defines the graphical presentation of its views. For example, an aircraft entity, such as an F-22 420, may provide views of the various cockpit displays such as virtual bezels, panels, and functional displays.

Figure 6:
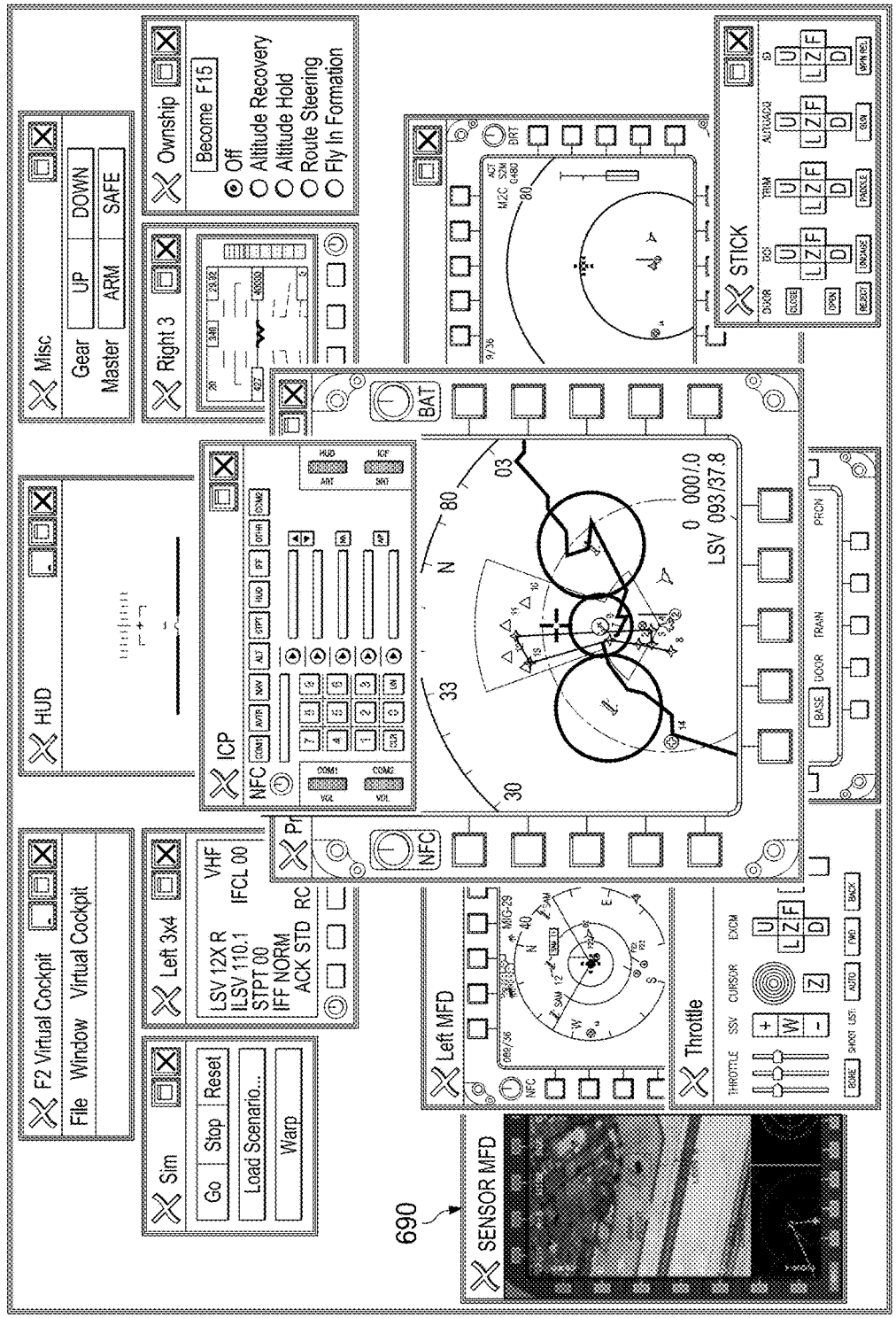
FIG. 6 is a display representation of various views of cockpit displays.

FIG. 6 shows a series of overlapping windows for of optional bezels, panels, and displays for the virtual cockpit view 425 of the preferred embodiment, including sensor multifunction display 690.

Figure 7:
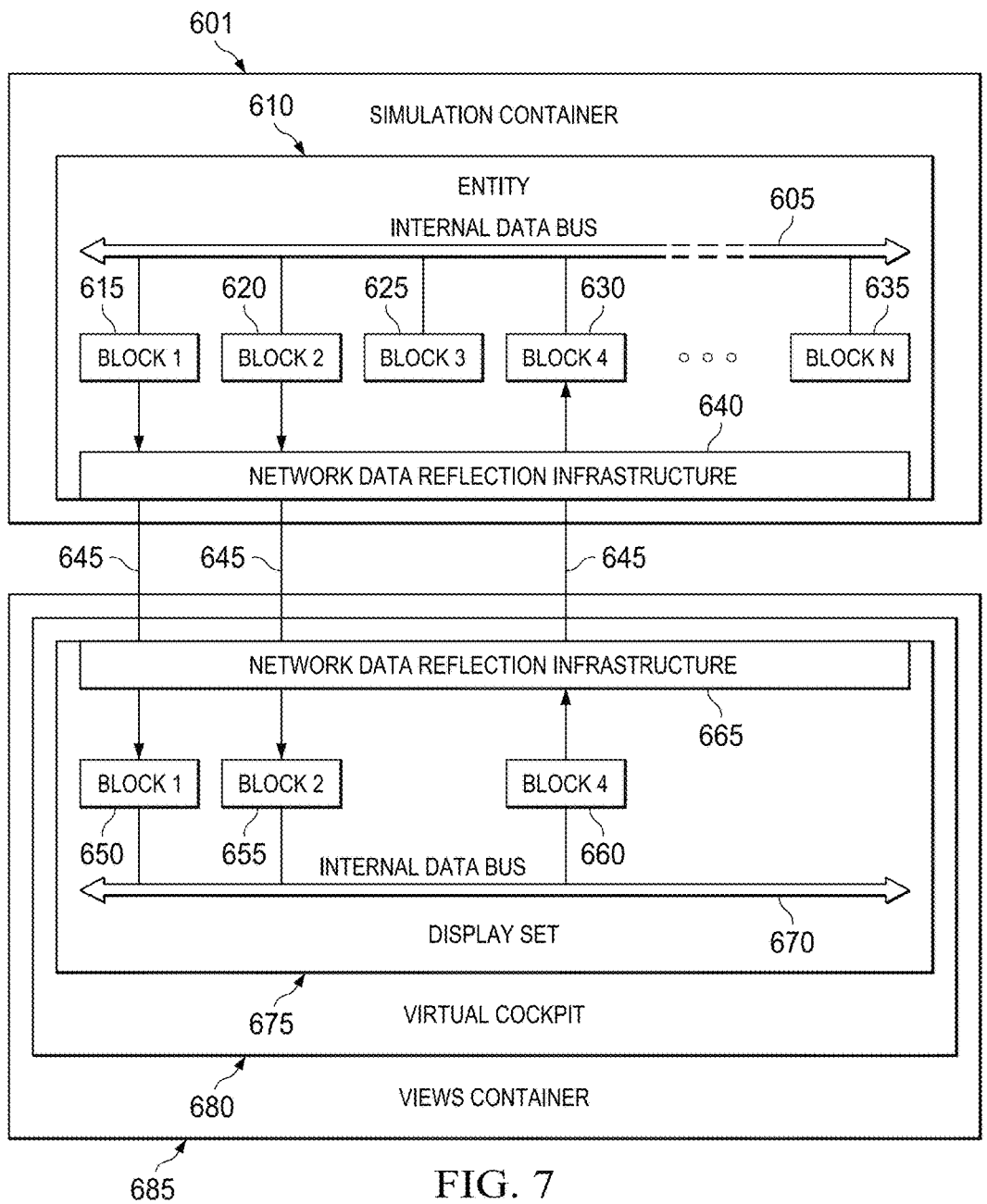
FIG. 7 is a schematic depiction of a simulation container, a communication channel, and a view.

Referring to FIG. 7, an implementation of the communication channel between views container 685 and simulation container 601 is schematically shown. Simulation container 601 and views container 685 can exist on remote computers connected by a network. However, in order for display set 675 to receive data necessary to update the graphical portions of the display, a communications channel must be established between simulation container 601 and views container 685. A communications channel is also necessary to communicate control information from the user interface from views container 685 back to simulation container 601. In the preferred embodiment, the communication channel provided between the simulation container 601 and the views container 685 is a user datagram protocol (UDP) based network data reflection infrastructure. The infrastructure includes a source side reflective memory component 640 and a destination side reflective memory component 665. The reflective memory components 640 and 665 cooperate to transmit and duplicate data which is required to be sent between the simulation container and the views container.

In an alternate embodiment the communication channel provided between the simulation container 601 and the views container 685 is a TCP-based event queue mechanism. In this embodiment, queue mechanism actions are collected from the various hardware devices on the operator station of interest and converted into a standardized stream of events that is sent serially over TCP connection in order of occurrence to a receiver on the container side. The receiver then routes events to interested participants or other entities or non-entities.

Entity 610, such as a participant, which resides within simulation container 601 creates various entity data blocks 615-635 which are available to entity 610 through internal data bus 605.

Views container 685 supports graphical participant interface object 680. Display set 675 generates data blocks 650, 655 and 660. Data block 660 is available through internal data bus 670 to entity 610.

Views container 685 contains graphical participant interface object 680. In one embodiment, graphical participant interface object 680 is a virtual cockpit. When graphical participant interface object 680 executes, display set 675 determines and requests what data blocks it needs from the simulation container to drive specific functions and displays. The graphical participant interface object registers a request for the data blocks with the simulation container. Entity 610 within the simulation container responds and sends the requested data blocks to reflective memory component 640. Graphical participant interface object 680 must explicitly subscribe under the publish/subscribe system to receive data blocks. Conversely, simulation container 601 does not subscribe under the publish/subscribe system. Data blocks that graphical participant interface object 680 publishes, such as data block 660, are always transmitted over the channel 645 to connected simulation container 601.

When a display set 675 executes in graphical participant interface object 680, display set 675 negotiates a communication channel 645 with its counterpart in the entity 610 within the simulation container over which requested data blocks can be sent. Data blocks can be requested by a plurality of graphical participant interface objects simultaneously. The negotiation of the communication channel 645 to be utilized is known in the art. The underlying mechanism used to transmit the messages is known as the Java Remote Method Invocation (RMI).

In one embodiment, data block 650 is a sensor graphical "frame" that supports a video image sent separately, as previously described, to the views container 685. Display set 675 determines and requests corresponding data block 650, as previously described. Data block 650 further includes a set of instructions that includes the location of the video image. Display set 675 executes the set of instructions to locate, and combine the separately sent video image with the graphical frame to display a sensor multifunction graphical display.

The amount and frequency of data transmissions may vary depending on the needs of specific entities. Entities are actually only connected during the publish-subscribe process. For example, it is possible many entities can exist in a container but that only a few will need to actually communicate on the network. "On demand" connection reduces bandwidth consumption and the overloading of system capabilities.

FIG. 7 describes one possible communication channel. Any desired communication technique can be used to transport the required data blocks between containers provided it is stable and does not require execution time exceeding that available in the simulation container run loop.

Returning to FIG. 5, mission overview container 402 provides attributes and methods which coordinate the physical location of the entity in space with an environment map. Mission overview container 402 also provides an interface which allows the user to define the geographical scope of the display by container views object. In the preferred embodiment, physical positions of the participant location and orientation of various aircraft participants are shown in relationship to a geographical map of a section of the earth and are known as the god's eye view object 404.

Of course in other embodiments physical positions of participants and the geographic map can be replaced by descriptions relevant to the problem domain. For instance with respect to an industrial robotic application the mission overview container could contain view objects which include a plant floor map with respect to various robots and position of the various robots with respect to each other. In another example mission overview container 402 could provide a global view object to graphically show the proliferation of disease and infection rates relative to participants.

Operator console container 401 is a list-based view 403 that provides access to information related to all participants in the simulation. From the operator console 401 participants can access editing and/or inspection views. Additionally, from operator console 401 the operator can monitor and control the state of the simulation container. Operator console container 401 can accept "inspector" panels as plug-ins from each given type of participant. If an inspector is present the operator console container displays them and provides a user interface to view and possibly modify participant data which is represented by the inspector to the user for user interaction. The inspectors provide ways to alter participant data that are not available through the graphical participant interface.

Figure 8:
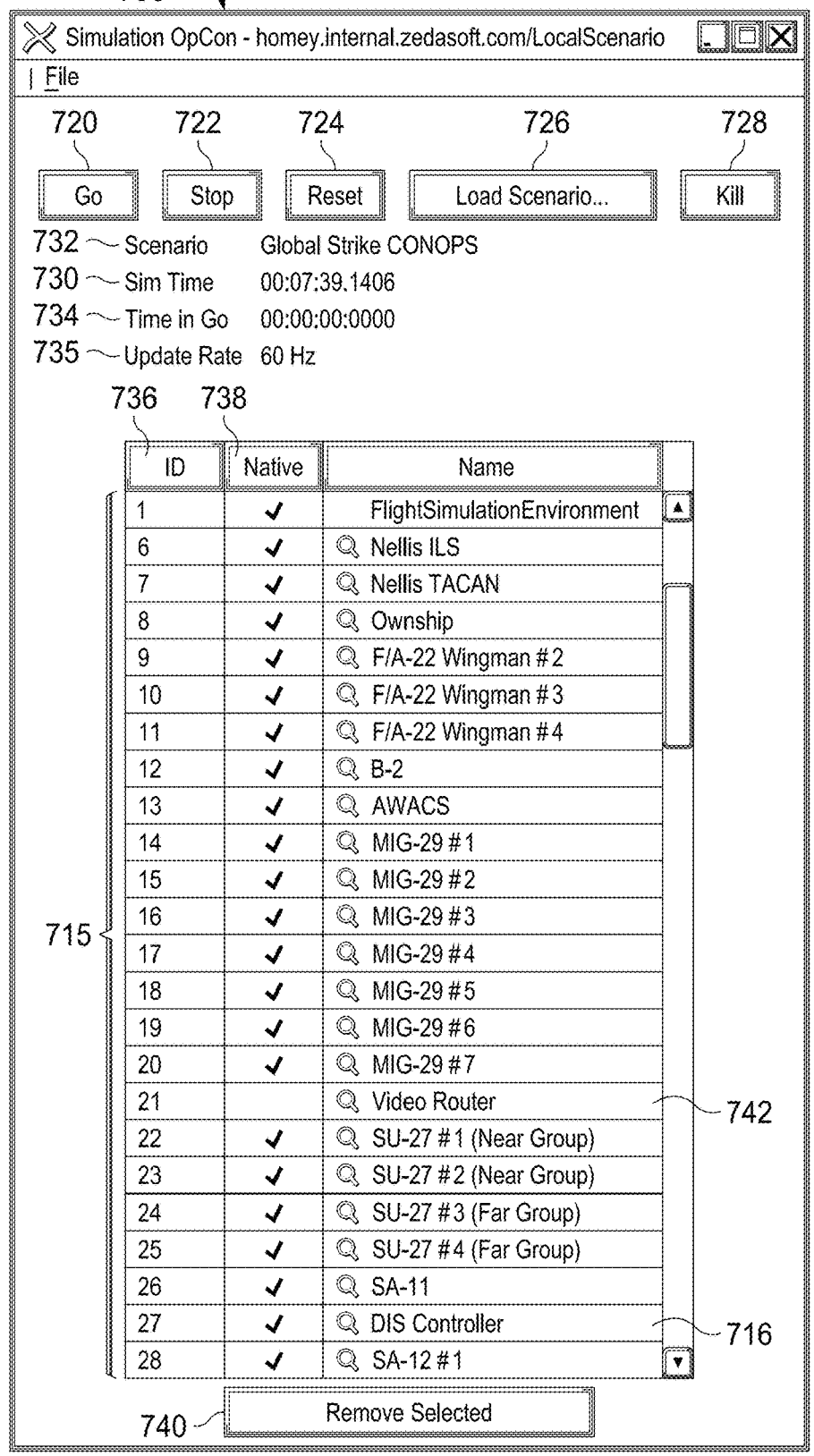
FIG. 8 is a display representation of an operator console view.

Referring to FIG. 8, operator console view 700 generated by the operator console as it appears in one embodiment is shown. Textual identifiers for both non-entity objects and entity objects are displayed in rows shown as 715. The operator console view allows control of the simulation through an activation of "go" button 720. Similarly, stop button 722 allows pausing of the simulation. Button 724 provides a "reset" function which starts the scenario from the beginning without loading a scenario or the associated scripts. However, if a new scenario is to be loaded, button 726 is provided which invokes the scripts for a new scenario to be loaded into memory. Kill button 728 is provided which allows termination of the simulation container to which the operator console is attached.

Line 730 provides a simulation time indicator, which is a display of the artificial clock provided to indicate to the various scripts and control objects the total time the attached simulation container has been running.

At 732, a scenario name designation is provided. At line 734, an indication of how long the simulation has been in operation is provided. The number of times per second that each object is updated is provided in cycles per second at line 735.

Column 736 provides an identification number arbitrarily assigned to the various entities and non-entities determined by the time they were added to the simulation. Column 738 indicates whether the object listed is native to the simulation container or whether it has been imported from a separate container outside the simulation through a network connection.

Examples of entity objects can be seen at line 14 through 20 identified as various "MIG-29" aircraft. Other examples are shown as "SV-27" aircraft at lines 22-25. An example of a non-entity object listed on the operator console view is shown at line 1. At line 21, another non-entity object 742 is identified as "Video Router." At button 740, functionality is provided to eliminate participants from the simulation which has been selected by the operator.

In operation, the operator console view 700 provides a displayed list of all simulation participants running within a simulation. The operator can scroll through a textual list of participants which in turn accesses attributes and methods in the participants that are participating in the simulation through inspector panels. Inspector panels are generated by the operator console container by application of the data supplied by each participant as supplied through the appropriate plug-in. In the preferred embodiment, an inspector panel is provided by a participant plug-in which includes the ability to alter or make inoperable a list of aircraft parts such as aircraft control surfaces, engines, hydraulic systems, navigation systems, landing gear, electrical systems, mechanical systems, weapons delivery systems, and fuel management systems. Each participant and plug-in defines the interfaces that let operators interact with entities of its class. These interfaces are made available via either the operator console (for changing properties during a running simulation), or the scenario generator (for changing properties of the static picture of the simulation missions).

Of course, each type of participant can provide a unique inspector panel plug-in design to allow modification of attributes of that participant.

Figure 9:
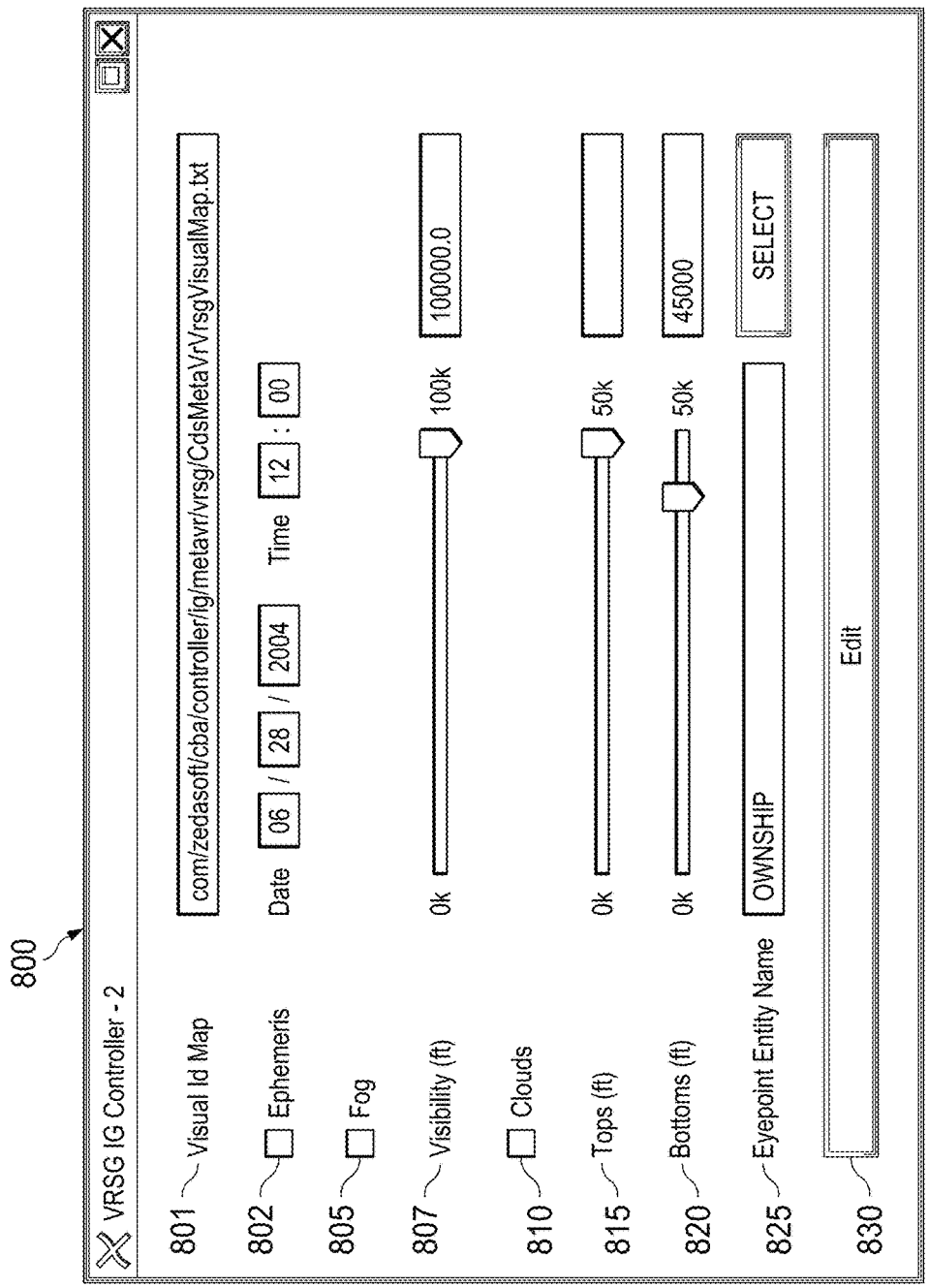
FIG. 9 is a display representation of an inspector panel view.

For example, FIG. 9 provides an example of an inspector panel 800 for an environment atmosphere object. The inspector panel plug-in allows attributes of the object to be changed during the simulation. It provides for operator control of attributes such as fog select 805, visibility slide bar 807, clouds select 810, cloud tops 815 and cloud bottoms 820 in feet. Inspector panel 800 includes identification of which visual map is in effect at box 801. Ephemeris indicator 802 determines whether the visual scene will activate features that are dependent on the time of day, such as the presence of the sun and stars. Eyepoint entity name 825 allows the operator to select the perspective from which visual scene will be viewed. In this example "ownship" indicates that the perspective from which the scene will be that of the aircraft entity associated with the cockpit interface. Edit button 830 allows changes in the object to be activated.

Returning to FIG. 8, the existence of a bridge participant is displayed on a list provided on the operator console view at 716. When selected, attributes of bridge participant 716 are displayed. An example is shown in FIG. 10.

Referring to FIG. 10, in this example, the bridge participant is a "bridge" to external simulator system via standard simulation networking protocols such as distributed interactive simulation (DIS) IEEE Standard 1278-1 or high level architecture (HLA) IEEE Standard 1516. Remote simulations communicate with the container via a DIS controller 950. The DIS controller 950 provides an operator with a plurality of input functions to the simulation. However, any of the participants in the list may provide an operator console interface independent of any other graphics view.

Exercise ID function 955 includes an input box which allows the operator to assign a number to the simulation which is used to identify the bridge participant associated with the DIS controller. Site ID function 960 allows the operator to assign the logical location of the processor from which the bridge participant associated with the DIS controller is located. Similarly, internet address function 975 allows the operator to input the internet address to which the DIS controller sends data. Application ID function 970 allows the operator to input an identifier for the software module running on the bridge participant.

Enabling of sending and receiving of participant updates is provided with a check box at 982. Similarly, updates for warfare entities are allowed or disallowed at check box 984. Check box 986 allows for the enablement of sending simulation management updates. Check box 988 enables the DIS controller to receive management updates from a non-native controller. Check box 990 allows DIS controller to send or receive IFDL (Intra-Flight Datalink) updates. Check box 992 provides for updates to the continuous or "wrapped. The system includes other detailed inspection mechanisms which can be extended to inspect the performance position and function of the participants in the system. Additionally, other detailed inspection mechanisms can be added for extensibility. Editing the functions enabled by highlighting the edit button at 953, otherwise, each of the functions is locked during simulation time. Port 980 specifies which communication port is to be used on the host computer running the simulation container.

Figure 11:
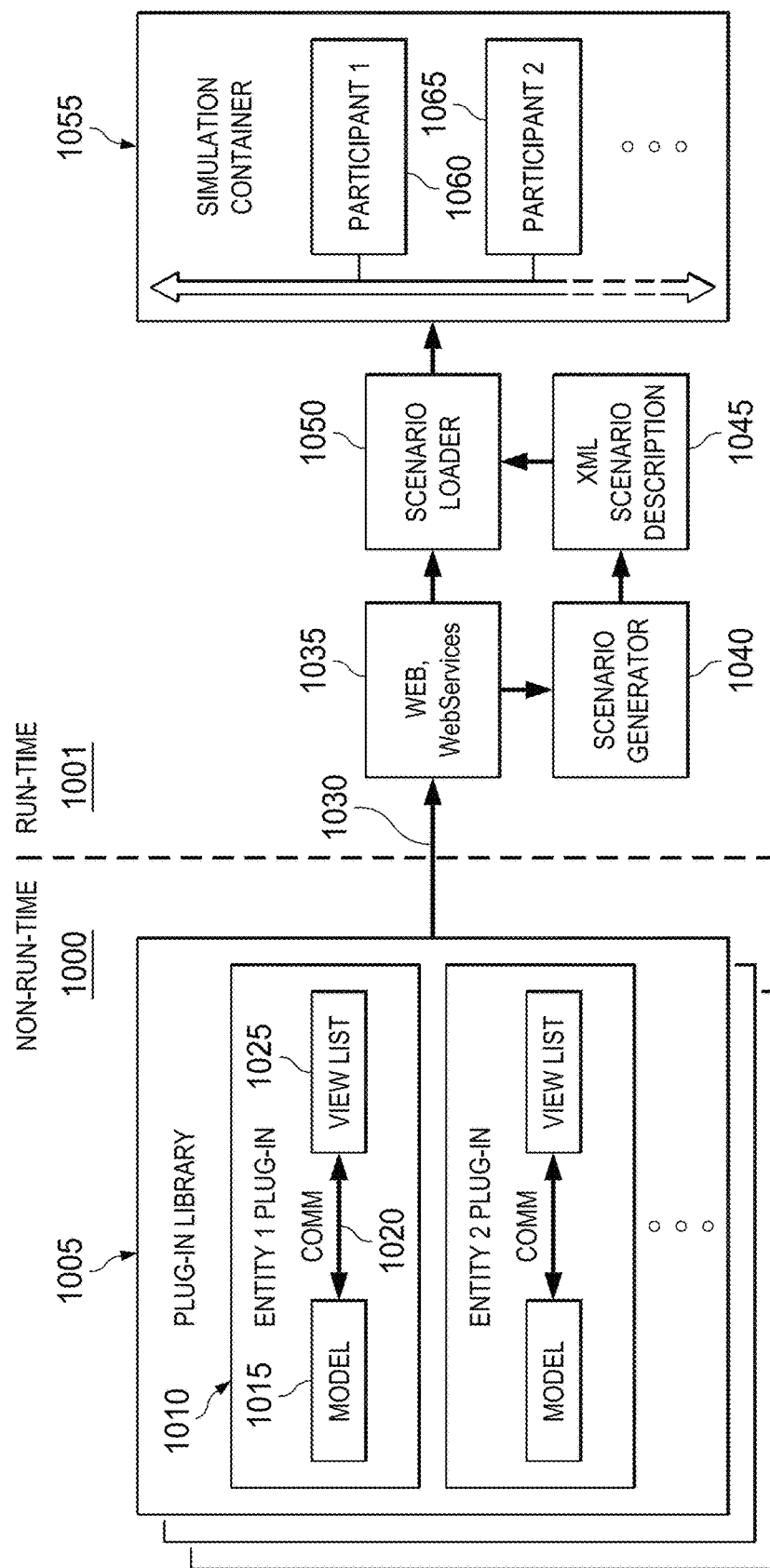
FIG. 11 is a schematic depiction of the container creation process according to the preferred embodiment.

Referring to FIG. 11, a schematic of the container creation process according to the preferred embodiment is shown. For clarity of description, FIG. 11 is divided into a non run-time side 1000 that shows organization of objects before a simulation is started and a run-time side 1001 that shows the simulation container after objects are instantiated and the simulation is running.

A file-based plug-in library 1005 exists before the simulation starts. The file-based plug-in library 1005 can include a virtually infinite number of entity plug-ins 1010 limited only by available space on the computer disk storage system. Each member of the library defines a participant or object which will operate in the simulation container. Plug-ins 1010 adopt specific interfaces expected by the simulation container that permit operators to interact with entities of its class and which allow the entities to interact with each other. Other interfaces permit view containers to host GUI components defined by the plug-ins. For example, inspectors are made available via the operator console (e.g., for changing properties during a running simulation), or the scenario generator 1040 (e.g., for changing properties of the initial simulation conditions). Interaction with the entities defined by the plug-in library 1005 occurs through interfaces adopted by plug-ins 1010. Applications that need to interact with the entities within library 1005 can be extended by the addition of plug-ins without further modification. Entity descriptions are stored in plain-text ASCII XML files. The XML files can be of arbitrary complexity and can load properties for an object of any class, including new classes added by the user.

Each entity plug-in 1010 may include a model 1015 and may include view list 1025. Model 1015 is a list of attributes and methods that describe the entity defined by the plug-in. For example, if the entity plug-in defines an aircraft, one attribute might be maximum possible speed which could be survived by the airframe. Methods for this model might include equations which define the amount of thrust produced by an engine based at a certain throttle setting and how much fuel is consumed. View list 1025 is a pre-defined list of views in which the participant will appear in the simulation.

Model 1015 and view list 1025 are linked by a predetermined type of communication link 1020. Communication link 1020 is a cooperating set of methods to invoke the network data reflection infrastructure and set up the data bus, but is not active until run-time of the simulation.

Moving now to implementation of the plug-in library during run-time 1001; scenario loader 1050 loads plug-in library 1005 and XML scenario description 1045 if available. Scenario loader 1050 first examines the XML file, then begins navigating through it from start to finish. Each time scenario loader 1050 encounters a directive to create a new object, it determine what class of object to create via either a directive that might be included in the XML file, or indirectly by interrogating the run-time system for the type of the enclosing class presuming that the type is in fact instantiable. If the type is not instantiable, then a specific class is not provided and the XML file load fails. Plug-in library 1005 can be loaded into the simulation container over a local or remote network, indicated by arrow 1030. In case of location and loading over the internet, certain internet services as known in the art are required and provided by web services at 1035. Upon download of desired entity plug-ins 1010, scenario loader 1050 allows modification of and interaction with the plug-ins through scenario generator 1040.

Scenario generator 1040 creates least one XML scenario description 1045 that describes the initial attributes and number of participants that will participate in the simulation. Scenario generator 1040 allows inspectors to be used to examine data in a non-executing container. The XML file describes the properties that participants in the container will have at the time the container is created. For an example in the preferred embodiment, the XML scenario description may contain five aircraft, three ships, seven tanks and other desired participants at particular specified locations in the environment. In this example the process of scenario generation will result in an XML file that describes these fifteen objects and their attributes, positions, velocities and accelerations in space, along with the properties of any other non-entity participants required. Each participant plug-in defined by the XML scenario description file defines the interfaces that allow users to interact with the entities of its class. The XML scenario description 1045 also sets properties of the simulation container 1055 such as life span and geographical or special scope of the simulation.

Scenario generator 1040 uses shortcuts to load predetermined parameters and behaviors into the XML file. The shortcuts are represented by graphical icons that can be easily identified and manipulated by the operator to create a scenario. An XML scenario description 1045 can also be created manually by a user via a plain text editor without the use of the scenario generator 1040.

After loading the plug-in library and the XML scenario description, scenario loader 1050 creates and executes simulation container 1055. Instances of each participant are created by the scenario loader and delivered to the simulation container. Scenario loader 1050 creates instances as specified in XML scenario description 1045. Once creation of the populated container is finished the container executes in its own thread and the scenario loader enters a monitoring mode waiting for commands from the network.

Scenario loader 1050 is capable of interacting with participant classes even if the classes were unknown to scenario loader 1050 prior to encountering a reference to them in XML scenario description 1045. In the preferred embodiment, creation of classes during run-time is enabled by the use of which data that describes the class. For example, if a class has a property called "latitude," information can be discovered about this property from the Java runtime system such as the latitude's type and mechanisms for setting its properties. In computing environments which allow searches of meta data, such as Java, the user can identify and modify properties of classes during run-time.

Scenario loader 1050 then initiates simulation container's main execution loop. Simulation container 1055 instantiates participants such as 1060 and 1065 and prescribes that each entity advance execution of all methods and update all data buses. Communication with hardware display and data input devices begins through non-entity object updates. Remote clients, such as views are then allowed to connect to the container and/or its participants and interact with them through their respective interfaces. Input is received by the interfaces to the views and the simulation proceeds in the time domain provided by the simulation container. More precisely input s received at an operator station. The input from the input devices and interfaces are coalesced into an event stream of standardized format that is set to an event receiver operating in the simulation container. The event receiver then routes the events to registered entities which have indicated an interest.

During run-time of the simulation container, the loaded scenario may be changed. Simulation container 1055 discontinues execution and is discarded and a new XML scenario description 1045 is read by the scenario loader 1050. The simulation container's main execution loop is then restarted by the scenario loader using the new XML data to instantiate new objects.

Figure 12:
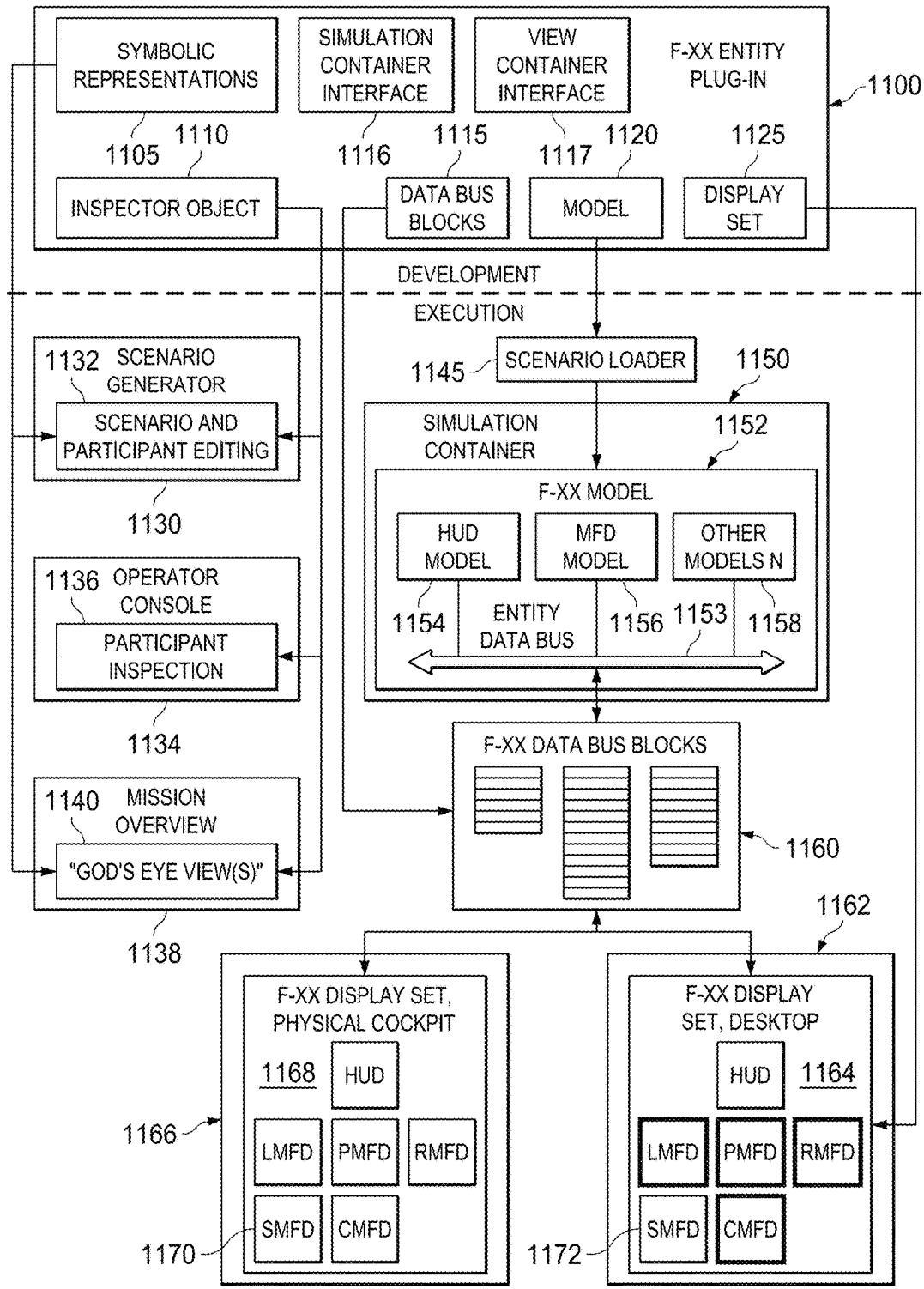
FIG. 12 is a schematic depiction of a physical entity object.

Referring to FIG. 12, the structure of a hypothetical F-XX fighter entity plug-in of the preferred embodiment and how it is distributed for execution is shown.

Plug-in 1100 is a set of code (or resources) to be used in the execution environment of the simulation by a participant and interfaces which are required to be instantiated by the simulation containers and views containers. These resources logically represent one participant in the simulation. The ability to "compartmentalize" a participant in a plug-in allows participant objects to be stored in a library for later use. The compartmentalization also allows for system extensibility because features of the participant objects can be changed at will without the need to modify the background software supporting the participant. Plug-in 1100 provides static components such as symbolic representations 1105, inspectors 1110, data bus blocks 1115, simulation container interface 1116, view container interface 1117, models 1120, and a display set 1125. At run-time the static components are distributed to various objects that provide an execution context. Symbolic representations 1105 include the graphic icons that will be used to represent the entity during the simulation on various views. Inspectors 1110 include attributes of the aircraft or environment which will need to be inspected or changed during initiation or operation of the simulation. Data bus block 1115 provides internal data as to the status of various attributes of the aircraft to data bus blocks memory 1160 at the beginning of the simulation and can be modified during run-time simulation. Simulation container interface 1116 provides the methods needed to allow the participant to be instantiated into the simulation container. View container interface 1117 provides the methods needed to allow the participant to be instantiated in one or more view containers. Display set 1125 contains, in this case, all multifunction display views and heads-up display views for the hypothetical F-XX entity, including sensor multifunction displays 1170 and 1172.

Model 1120 is loaded and potentially modified by scenario loader 1145. An instance of the models class is created by the scenario loader and initial values from the XML files are then used to modify the instance. Model 1120 contains various methods to predict the physical response of a physical entity and attributes which define the entity. Model 1120 executes within simulation container 1150 in steps, prompted by the master loop trigger received from simulation container 1150. In operation of F-XX model 1152 instantiates other objects for particular purposes. In this case F-XX model 1152 instantiates heads up display model object 1154, multifunction display object 1156 and other models object 1158. Multifunction display object 1156 includes a model and a set of instructions for sensor multifunction displays. Each of the objects within F-XX model 1152 communicates with entity data bus 1153 and F-XX data bus blocks 1160. Views 1164 and 1168 are static until such time as update data is provided by running model 1120. Communication between virtual cockpit view 1164 and physical cockpit view 1168 and model 1120 takes place through access to data bus 1160.

Graphical participant interface objects 1162 and 1166 operate as distinct containers that can execute and run on separate computers connected to the computer running the simulation container 1150 through a network. Each of graphical participant interface object containers 1162 and 1166 relies on the plug-in display set 1125 to provide the appearance parameters of the views. Display set 1125 comprises a plurality of information and graphical representations that are used to create the graphical displays. The data needed to drive the functions of the display are provided by access to the data bus blocks 1160 across the network.

In a preferred embodiment, the data bus blocks provide information such as aircraft avionics updates, aircraft engines updates, and aircraft airframe status updates.

FIG. 12 shows two views of graphical participant interface objects 1162 and 1166. Multiple views may communicate simultaneously with a given model 1120. In FIG. 12, one set of views is acting to cater to a physical cockpit and another to a virtual cockpit. The physical cockpit view 1168 includes a plurality of multifunction displays. Display set 1125 of the plug-in 1100 for the desktop cockpit view 1164 similarly includes a plurality of multifunction displays for the virtual cockpit. Each of the multifunction displays supports a set of "pages". The "pages" include a heads-up multifunction display, a left multifunction display, a primary multifunction display, a right multifunction display, a sensor multifunction display, and a center multifunction display. Other types of pages may be employed. Each "page" is dedicated to a function. For example, the functions include stores inventory management, radar control, and infrared (IR) targeting pod control, and a tactical overview map. Any type of function may be employed.

In one embodiment, each function has a dedicated page or set of pages, to display its function.

Figure 13:
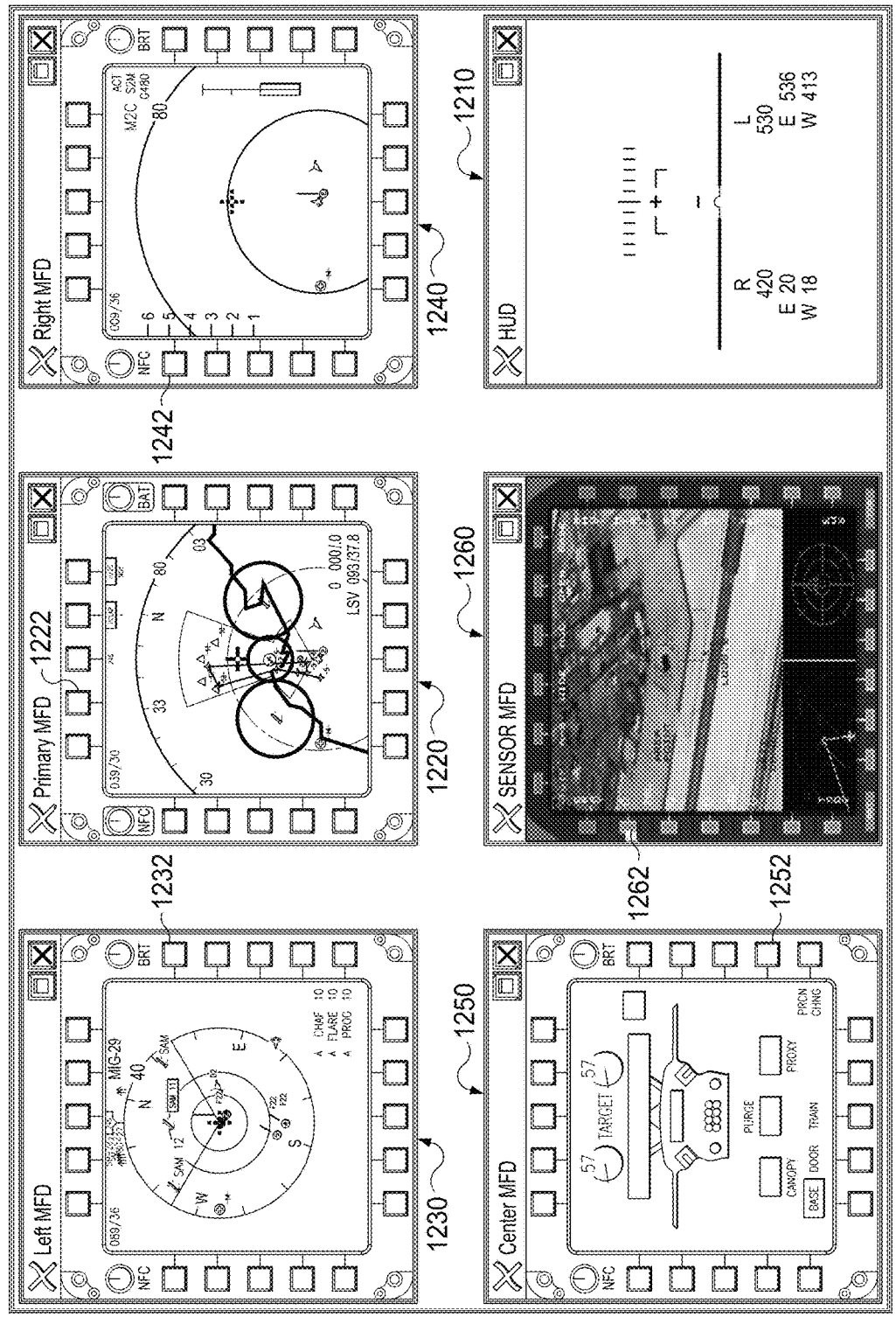
FIG. 13 is a display representation of a virtual cockpit display.

Referring to FIG. 13, an example of the desktop cockpit view is shown. FIG. 13 shows a heads up display page 1210, a primary multifunction display page 1220, a left multifunction display page 1230, a right multifunction display page 1240, a center multifunction display page 1250, and a sensor multifunction display page 1260. In a preferred embodiment, the heads up display page 1210 displays an artificial horizon and information related to other participant entities. Primary multifunction display page 1220 displays a relative position of the aircraft participant entity with respect to geographical map data and other data such as radar ranges and weapons ranges. Primary multifunction display page 1220 also provides a series of buttons an example of which is shown as 1222. In a preferred embodiment, the buttons are screen sensitive and act as data input devices which communicate to a non-entity participant running within the simulation container and provides user input of aircraft control information.

In a preferred embodiment, any of the heads up display page 1210, the primary multifunction display page 1220, the left multifunction display page 1230, the right multifunction display page 1240, the center multifunction display page 1250, and the sensor multifunction display page 1260 can display any page.

Left multifunction display page 1230 in the preferred embodiment provides radar information and other tactical information. Left multifunction display page 1230 provides for input sensitive buttons, an example of which is shown as 1232. In a preferred embodiment, the buttons are screen sensitive and act as data input devices which communicate to a non-entity participant running within the simulation container and provides user input of aircraft control information.

Right multifunction display page 1240 in the preferred embodiment provides tactical information related to the aircraft weapons systems. Mechanical input buttons, an example of which is shown as 1242 provide for user input information related to the display. The user input is communicated via non-entity participant running in the simulation container.

Center multifunction display page 1250 in the preferred embodiment displays information related to aircraft operations such as engine status, fuel status and operation of various control surfaces of the aircraft. Center multifunction display page 1250 provides for user input buttons 1252 which communicate user input related to the entity participant through a non-entity participant to the simulation container.

Sensor multifunction display page 1260 displays a thermal video image of a target. Sensor multifunction display page 1260 provides for user input buttons which communicate user input via a non-entity participant running in the simulation container.

Returning to FIG. 12, data bus block 1160 communicates between simulation container 1150, and view components 1164 and 1168 through postings using the publish/subscribe service provided by the simulation container. The graphical interface objects 1162 and 1166 and simulation container 1150 are defined in terms of interfaces and plug-ins. Therefore, new views can be implemented easily as long as interfaces are correctly implemented.

F-XX entity plug-in 1100 also includes symbolic representation object 1105 in communication with scenario generator 1130 for use in scenario and participant editing 1132. Symbolic representations 1105 are also in communication with the mission overview container 1138 for depicting symbols such as aircraft, targets, SAM sites, threat rings, and other representations useful in simulation displays.

F-XX entity plug-in 1100 also includes an inspector object 1110 in communication with the scenario generator 1130 for use in scenario participant editing 1132, the operator console container 1134 for participant inspection 1136, and the mission overview container 1138 for display of gods eye view object 1140. Inspector object 1110 functions as a graphical user interface to operator console container 1134 and permits interaction with a specific entity, such as the F-XX instantiated by the simulation container.

Although the preferred embodiment is written in the Java programming language, other programming languages, such as C++ and C#, can also be used to implement the concepts disclosed.

The present disclosure may be embodied in other specific forms without departing from the spirit or essential characteristics thereof. The present embodiments are presented merely as illustrative and not restrictive, with the scope of the disclosure being indicated by the attached claims rather than the foregoing description. All changes which come within the meaning and range of equivalency of the claims are therefore intended to be embraced therein.

The invention claimed is:

1. A video stream system executed by one or more computers, the video stream system comprising:
a simulation computer of the one or more computers that is programmed to:
instantiate a simulation container;
a video image computer of the one or more computers that is programmed to:
instantiate an image generator object that is in data communication with the simulation container;
a display computer of the one or more computers that is programmed to:
instantiate a set of views containers that is in data communication with the simulation container;
the simulation computer further programmed to:
instantiate a participant object in the simulation container, the participant object in data communication with the set of views containers and the simulation container;
the display computer further programmed to:
instantiate a view object in each views container of the set of views containers, the view object in data communication with the participant object;
display a video image in the view object;
the simulation computer further programmed to:
receive an encoded video image;
redirect the encoded video image to the set of display computers;
the display computer further programmed to:
create a decoded video image from the encoded image; and,
generate a multifunction display from the decoded video image and a set of graphics.

2. The video stream system of claim 1, wherein a set of participant data is generated by the participant object.

3. The video stream system of claim 2, wherein the view object is a graphical display of the set of participant data.

4. The video stream system of claim 1, wherein a non-entity participant object is instantiated in the simulation container in data communication with the image generator object and the set of views containers.

5. The video stream system of claim 4, wherein the video image is distributed to each views container of the set of views containers by the non-entity object.

6. The video stream system of claim 1, wherein a participant list is instantiated in the simulation container.

7. The video stream system of claim 6, wherein a sensor object is instantiated in the participant object and in data communication with the participant list.

8. The video stream system of claim 7, wherein a set of sensor graphics is displayed in the view object.

9. The video stream system of claim 8, wherein the set of graphics is a graphical display of the sensor object.

10. The video stream system of claim 8, wherein the video image is combined with the set of sensor graphics in the view object.

11. The video stream system of claim 1,
wherein a communication channel; between the simulation container and a views container provides a user datagram protocol based network data reflection infrastructure;
wherein the network data reflection infrastructure includes a source side reflective memory for the simulation container and a destination side reflective memory for the views container;
wherein a graphical participant interface object of the views container explicitly subscribes to receive data blocks from the simulation container; and,
wherein the simulation container receives all data blocks from the graphical participant interface object.

12. In a container-based simulator comprising a network, a simulator computer connected to the network, a video image computer connected to the network, and a set of display computers connected to the network, the simulator computer programmed to store and execute instructions that cause the container-based simulator to perform a method comprising the steps of:
instantiating, by the simulator computer, a simulation container;
instantiating, by the video image computer, an image generator object that is in data communication with the simulation container;
instantiating, by at least one display computer of the set of display computers, a view container of a set of views containers in data communication with the simulation container;
instantiating, by the simulator computer, a participant object in the simulation container, and in data communication with the set of views containers and the simulation container;
instantiating, by at least one display computer of the set of display computers, a view object in each views container of the set of views containers and in data communication with the participant object;
receiving, by the simulator computer, an encoded video image;
redirecting, by the simulator computer, the encoded video image to the set of display computers;
creating, by at least one display computer of the set of display computers, a decoded video image from the encoded image; and,
generating, by at least one display computer of the set of display computers, a multifunction display from the decoded video image and a set of graphics.

13. The method of claim 12, further comprising the step of displaying the multifunction display.

14. The method of claim 12, further comprising the step of creating the encoded video image from a video image.

15. The method of claim 14, wherein the video image computer further comprises a first graphics processing unit programmed with a first set of library calls, and wherein the step of creating further comprises the step of encoding the video image in parallel with first set of library calls.

16. The method of claim 12, wherein each display computer of the set of the set of display computers further comprises a second graphics processing unit programmed with a second set of library calls, and wherein the step of creating further comprises the step of decoding the encoded video image in parallel with the second set of library calls.

17. A system for streaming a video image comprising a network, a simulator computer connected to the network, a video image computer connected to the network, and a set of display computers connected to the network:
the simulator computer programmed to carry out the steps of:
instantiating a simulation container;
instantiating a participant object in the simulation container and in data communication with a set of views containers and the simulation container;
receiving an encoded video image;
redirecting the encoded video image to the set of display computers;
the video image computer programmed to carry out the step of:
instantiating an image generator object that is in data communication with the simulation container;
each display computer of the set of display computers programmed to carry out the steps of:
instantiating a views container of the set of views containers in data communication with the simulation container;
instantiating a view object in each views container of the set of views containers and in data communication with the participant object;
decoding the encoded video image into a decoded video image; and,
combining the decoded video image with a set of graphics to create a multifunction display.

18. The system of claim 17, wherein each display computer of the set of display computers is further programmed to carry out the step of displaying the multifunction display.

19. The system of claim 17, wherein the video image computer is programmed to carry out the step of encoding the video image to create the encoded video image.

20. The system of claim 19, wherein the video image computer further comprises a first graphics processing unit programmed with a first set of library calls, and wherein the video image computer is further programmed to carry out the step of encoding the video image in parallel with first set of library calls.

21. The system of claim 17, wherein each display computer of the set of the set of display computers further comprises a second graphics processing unit programmed with a second set of library calls, and wherein each display computer of the set of display computers is further programmed to carry out the step of decoding the encoded video image in parallel with the second set of library calls.

* * * * *